United States Patent [19]
Dieleman et al.

[11] Patent Number: 5,341,356
[45] Date of Patent: Aug. 23, 1994

[54] METHOD AND DEVICE FOR RECORDING INFORMATION VOLUMES IN A TRACK OF A RECORD CARRIER, AND A DEVICE FOR READING THE RECORD CARRIER

[75] Inventors: Adrianus H. Dieleman, Eindhoven, Netherlands; Jos G. Schepers, Hasselt, Belgium; Gerrit D. Westerhout, Eindhoven, Netherlands

[73] Assignee: U.S. Philips Corporation, New York, N.Y.

[21] Appl. No.: 900,874

[22] Filed: Jun. 18, 1992

Related U.S. Application Data

[63] Continuation-in-part of Ser. No. 817,571, Jan. 7, 1992, abandoned.

[30] Foreign Application Priority Data

Apr. 2, 1991 [EP] European Pat. Off. ......... 91200764.8
Apr. 26, 1991 [EP] European Pat. Off. ......... 91201005.5

[51] Int. Cl.⁵ .............................................. G11B 15/05
[52] U.S. Cl. ........................................ 369/47; 369/48; 369/58; 360/72.2
[58] Field of Search ............... 369/47, 48, 58, 275.3, 369/109, 111, 129, 32; 360/72.2

[56] References Cited

U.S. PATENT DOCUMENTS

| | | | |
|---|---|---|---|
| 4,094,013 | 6/1978 | Hill et al. | 365/234 |
| 4,999,825 | 3/1991 | Raaymakers et al. | 369/44 |
| 5,001,692 | 3/1991 | Farla et al. | 369/48 |
| 5,060,219 | 10/1991 | Lokhoff et al. | 369/48 |
| 5,065,388 | 11/1991 | Roth et al. | 369/47 |
| 5,072,435 | 12/1991 | Bakx | 369/48 |
| 5,124,966 | 6/1992 | Roth et al. | 369/47 |
| 5,142,519 | 8/1992 | Horie | 369/48 |

FOREIGN PATENT DOCUMENTS 0390268 10/1990 European Pat. Off.

OTHER PUBLICATIONS

"Compact Disc Interactive Full Functional Specification", published by N V Philips and Sony Corporation, Mar. 1993.
"Information processing—Volume and file structure of CD-ROM for information interchange" International Standard, ISo 9660: 1988 (e); pp. 1–31.
U.S. 07/453,545, filed Dec. 20, 1989.
U.S. 07/856,216, filed May 13, 1992.
U.S. 07/667,848, filed Mar. 12, 1991.
U.S. 07/430,918, filed Oct. 31, 1989.

*Primary Examiner*—Robert J. Pascal
*Assistant Examiner*—Tan Dinh
*Attorney, Agent, or Firm*—Richard A. Weiss

[57] ABSTRACT

A method and device for recording successive volumes of information in successive sections of a track of a record carrier of an inscribable type. At the end of each information volume a lead-out signal is recorded. The lead-out signals include control information for controlling reading of the recorded information. When the record carrier is to be read out, the lead-out signal of the last recorded information volume is first searched for and the control information therein is used for controlling reading of the information in all of the recorded information volumes.

26 Claims, 14 Drawing Sheets

METHOD AND DEVICE FOR RECORDING INFORMATION VOLUMES IN A TRACK OF A RECORD CARRIER, AND A DEVICE FOR READING THE RECORD CARRIER

CROSS-REFERENCE TO RELATED APPLICATION

This is a continuation-in-part of application Ser. No. 07/817,571, filed Jan. 7, 1992 and now abandoned.

BACKGROUND OF THE INVENTION

1. Field of the Invention

The invention relates to a method of recording information volumes ("volume" being a particular set of data and/or other information) in a track of a record carrier of an inscribable type. In accordance with the method, control information for controlling reading of recorded information is recorded, and a lead-out signal denoting the end of each information volume is also recorded.

The invention also relates to a device for performing such a method. Such a device has an input for receiving information signals, a lead-out signal generating unit for generating lead-out signals, each of which denotes the end of an information volume, and a recording unit for recording the information signals and the lead-out signals.

The invention further relates to a device for reading a record carrier on which successive information volumes have been recorded in successive track sections, this device comprising a reading unit for reading the track sections.

2. Description of the Related Art

The aforementioned method and devices are known, for example, from European patent application EP-A-0390 268. That patent application describes a method and devices by which information can be recorded and read out from a CD of a write-once type.

Such a CD is also termed CD-WO (Compact Disc Write Once). A CD-WO is highly suitable for recording digitalized picture information produced from slides or photo negatives. The recording of these digitized pictures is known, for example, as the PHOTO-CD-SYSTEM. The PHOTO-CD obtained with this method can be read out, for example, with prior-art CD-ROM-XA and CD-I players, as well as with reading equipment specifically developed for the PHOTO-CD. A PHOTO-CD can accommodate the pictures of a number of photo negatives or slides. When these films are recorded, there will generally not be sufficient negatives or slides available to fill a PHOTO-CD completely, since usually only photo negatives or slides of a single photo film or slide film will be available at any one time. Therefore, there is a need for a recording method according to which the already recorded picture information can each time be supplemented in a simple manner by entering a number of additional pictures on the PHOTO-CD, and wherein all the recorded picture information can be read out rapidly and selectively after each supplement to the PHOTO-CD.

SUMMARY OF THE INVENTION

It is an object of the invention, for example, to provide a method and device(s) for satisfying the above need. With respect to the method, this object is achieved in that at least one additional information volume is recorded following a lead-out signal of a prior information volume, which additional information volume also comprises a lead-out signal denoting the end thereof. Control information for controlling the reading operation is included at least in the lead-out signal of the additional information volume being recorded.

With respect to a recording device of the invention, it comprises a unit for searching the lead-out signal of the last-recorded information volume, and a recording unit arranged for recording an additional information volume following that lead-out signal. The lead-out signal generating unit comprises a unit for inserting control information for controlling the reading operation of the recorded information in the lead-out signal.

With respect to a reading device of the invention, it comprises a search unit for searching for a lead-out signal denoting the end of the last-recorded information volume, a unit for storing the control information included in that lead-out signal, and a unit for controlling the reading of information volumes on the basis of the stored control information.

The recording method and device enable the pictures of a newly available collection of photo negatives or slides to be recorded on the record carrier as a newly-recorded information volume. The control information essential to the control of reading of the recorded information can be searched for on the basis of the control information available in the lead-out signal of the last-recorded information volume. This lead-out signal will always be located right before the beginning of the still unrecorded part of the record carrier and can, thus, be found more rapidly, for example, by detecting the transition from a recorded track section to an unrecorded track section. It is possible for the information essential for read-out control to be partly or completely included in the lead-out signal. Alternatively, it is possible to include the essential control information in one or more separate control files in another section of the information volume and to include a reference to this (these) control file(s) in the lead-out signal.

Though not imperative, it is preferable to include all the control information about previously-recorded information volumes in the last-recorded information volume, because then the control information essential for reading all the recorded information will be available at one place.

The lead-out signal at the end of the last-recorded information volume can be found in a rapid and simple manner by detection of the transition from a track section that contains information to a track section that is still empty. For disc-shaped record carriers of the CD-WO type, this can be effected in an extremely simple manner by detecting the presence of a high-frequency signal component in the read-out signal during a radial displacement of a read/write head.

When information is recorded according to the invention, the information volumes, with the exception of the lead-out signal, can be recorded entirely in accordance with the CD-ROM-XA and CD-I standards already used. The address information in the lead-out signal is preferably recorded in the subcode Q-channel in a mode differing from the mode prescribed in the standard. In that case, reading, the CD-WO which has been recorded by this method does not present any problem, because this mode of the subcode Q-channel is not recognized by conventional read equipment and, therefore, will be discarded. The control information included in the lead-out signal will not be recognized either for the same reason. However, the necessary control information is also recorded according to the CD-ROM-XA and CD-I standards in other sections of the information volumes. With the prior-art reading equipment access to address and other control information in the last-recorded signal parts cannot be realized as rapidly as with the reading device according to the invention, because addresses for these signal parts are not available. Such signal parts can be found easily according to the invention, at the end of the last-recorded signal part on the CD.

It should be observed that the invention is especially suitable for recording CD signals on a CD-WO, for example, signals structured according to the CD-ROM-XA or CD-I standard. Alternatively, however, the invention is suitable for use in other recording and reading systems with which the user always wishes to record supplements on a record carrier that is already partly filled.

DETAILED DESCRIPTION OF THE DRAWINGS

Further embodiments, as well as their advantages, will be described in detail with reference to the FIGS. 1 to 27a–27d, in which.

Figure 3:
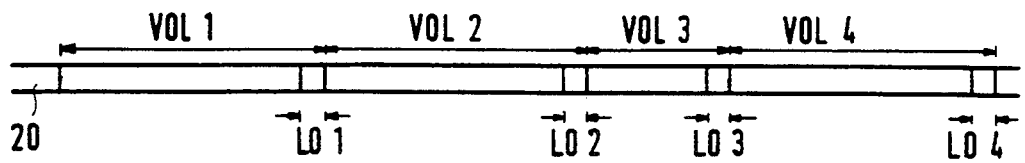
Figure 4:
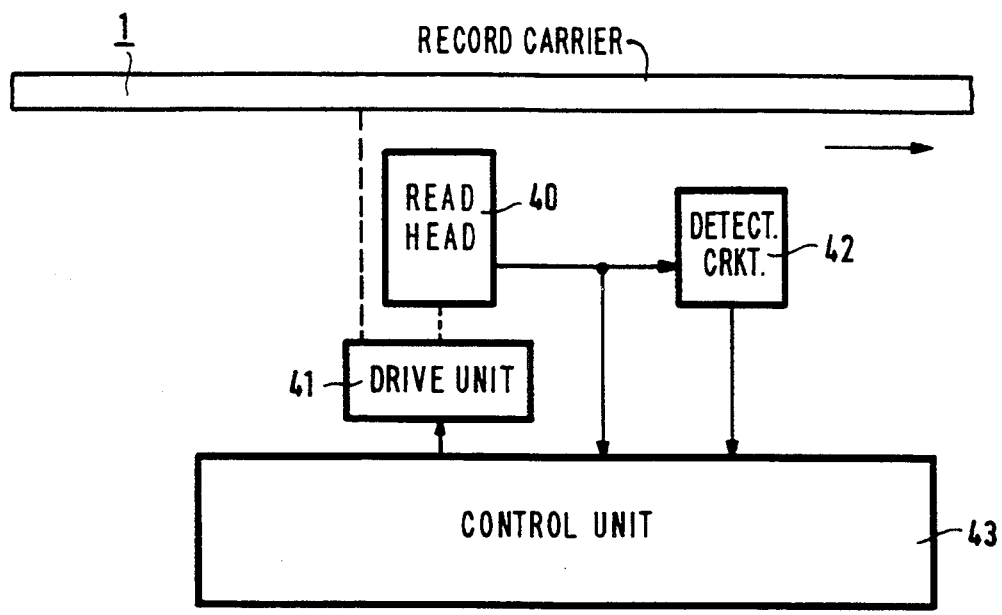
Figure 5:
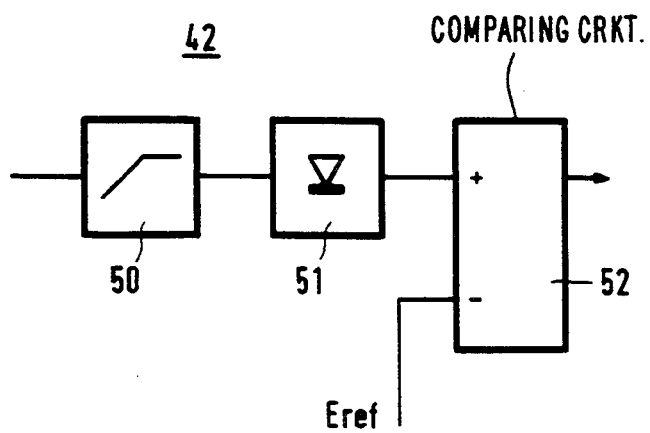
Figure 7:
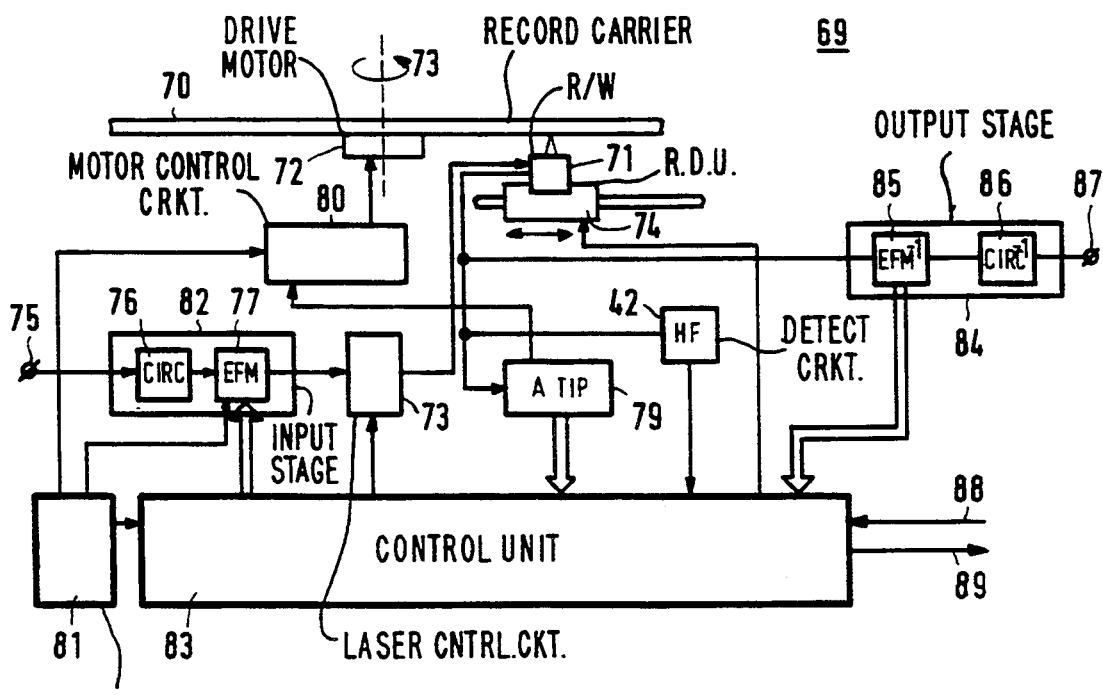
Figure 8:
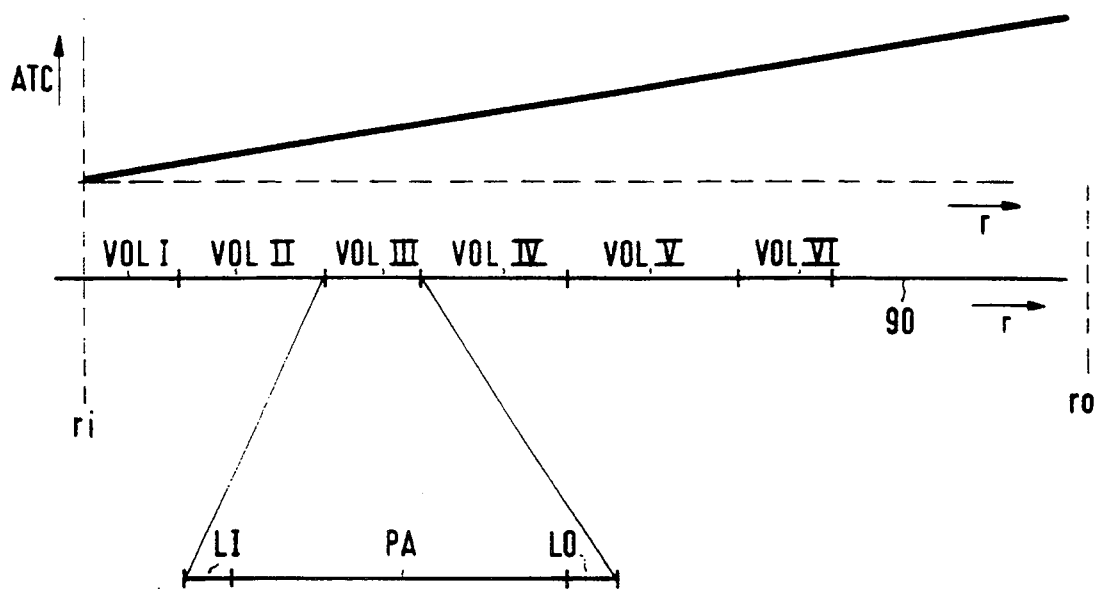
Figure 9:
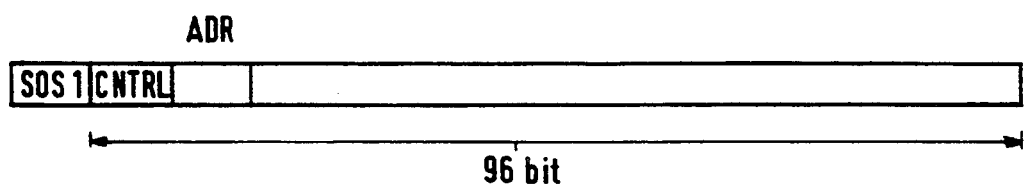
Figure 10:
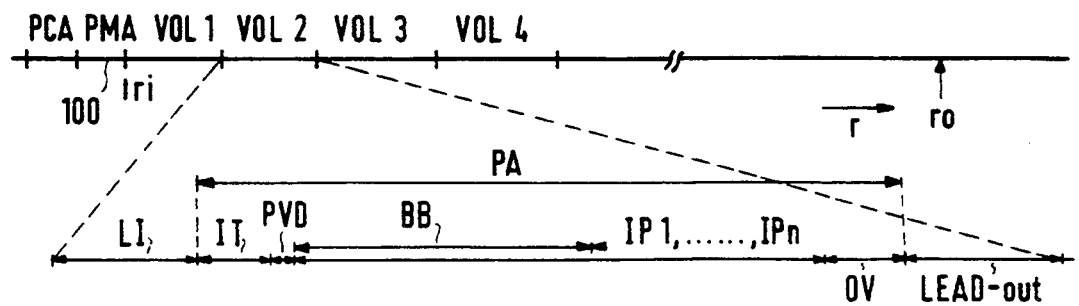
Figure 11:
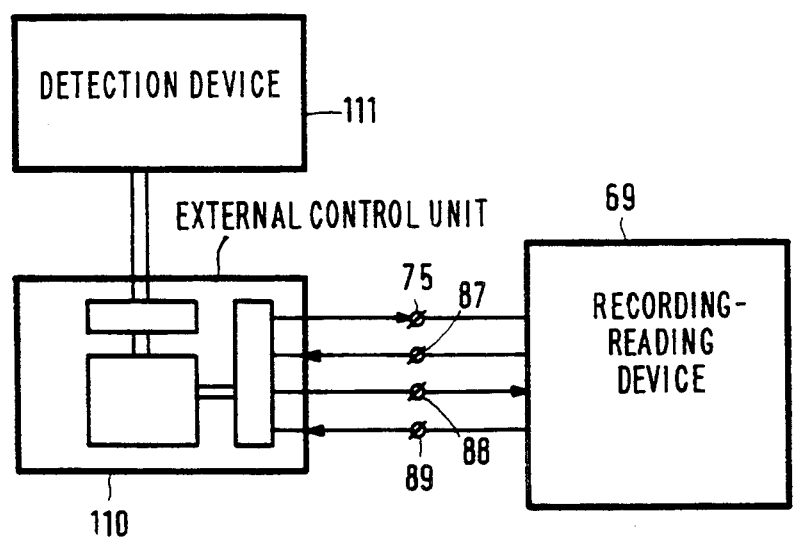
Figure 16:
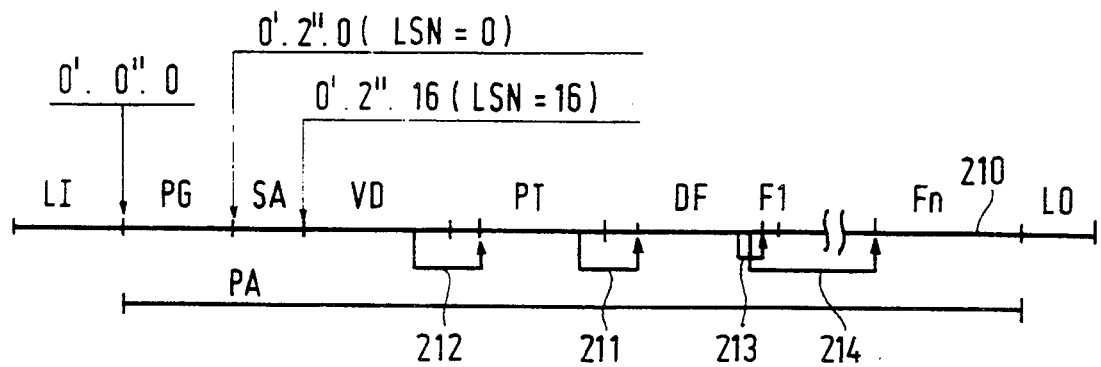
Figure 17:
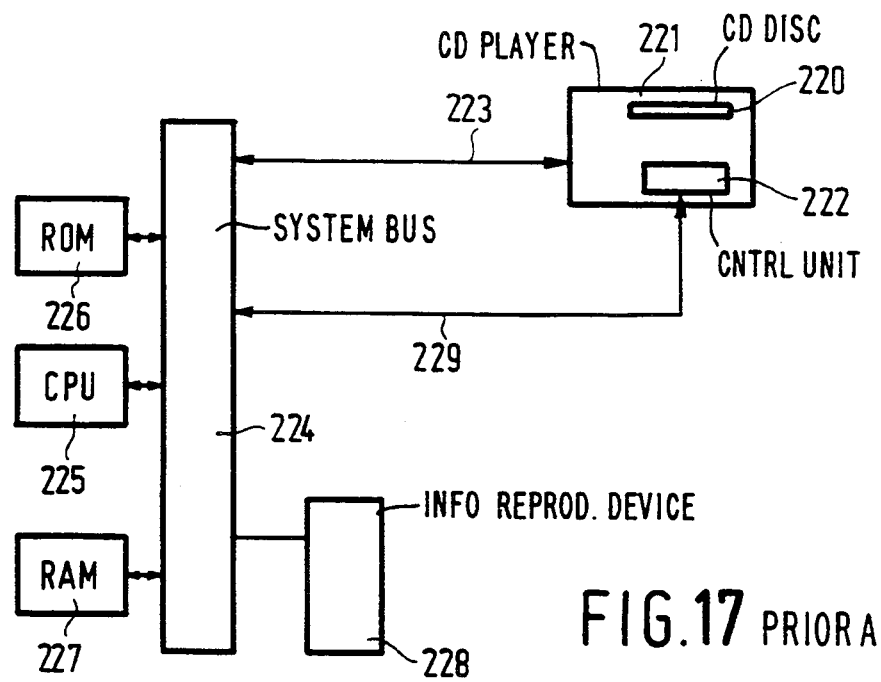
Figure 18:
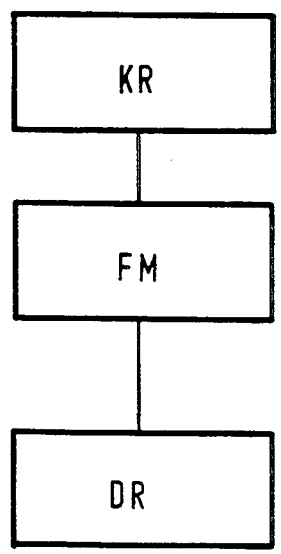
Figure 19:
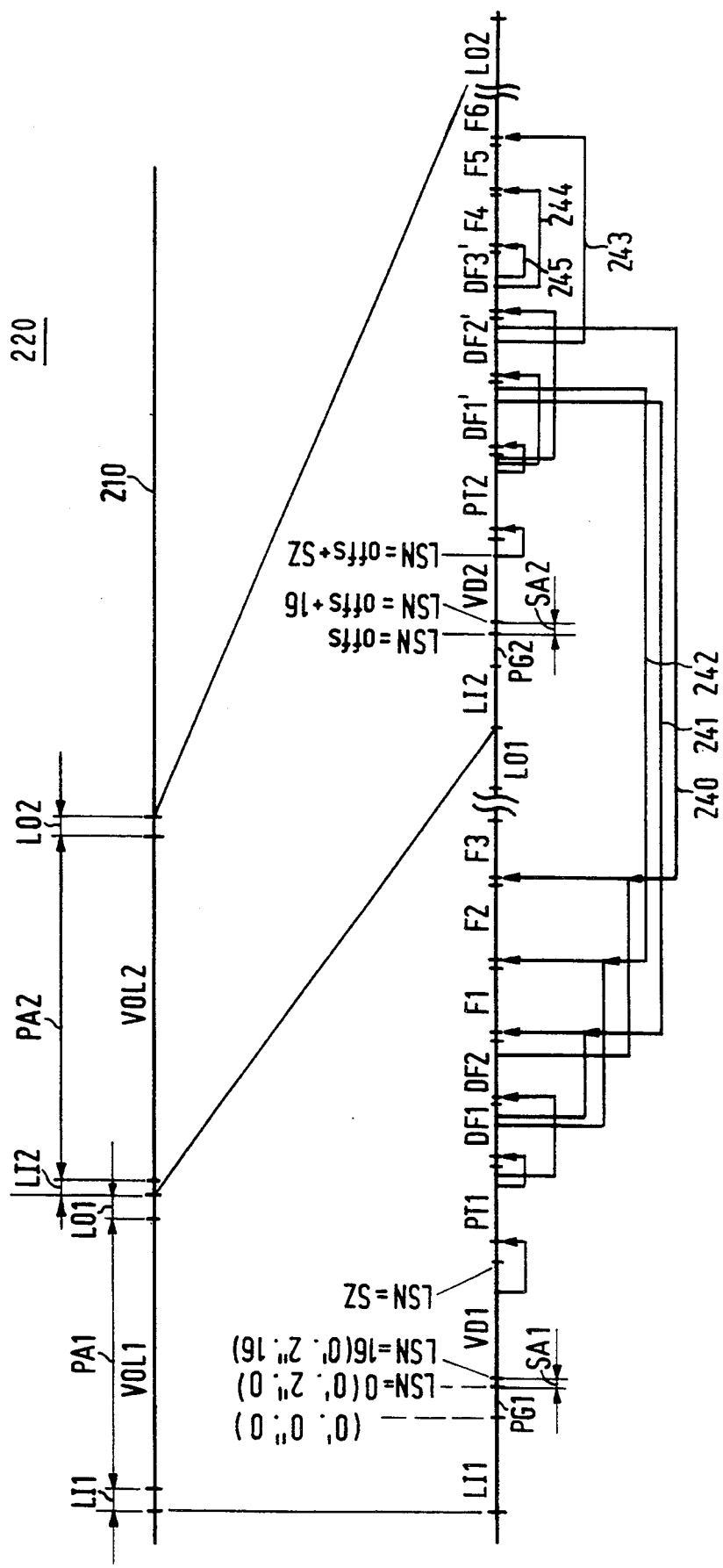
Figure 20:
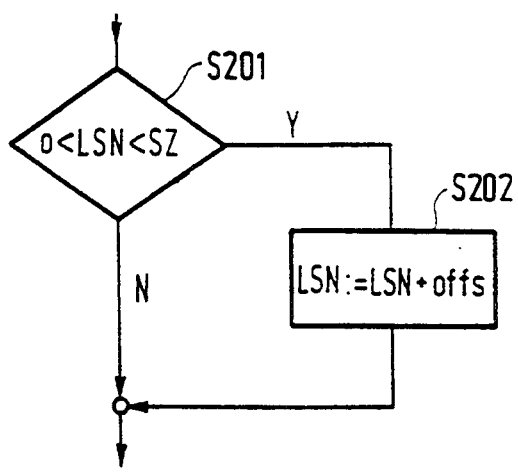
Figure 21:
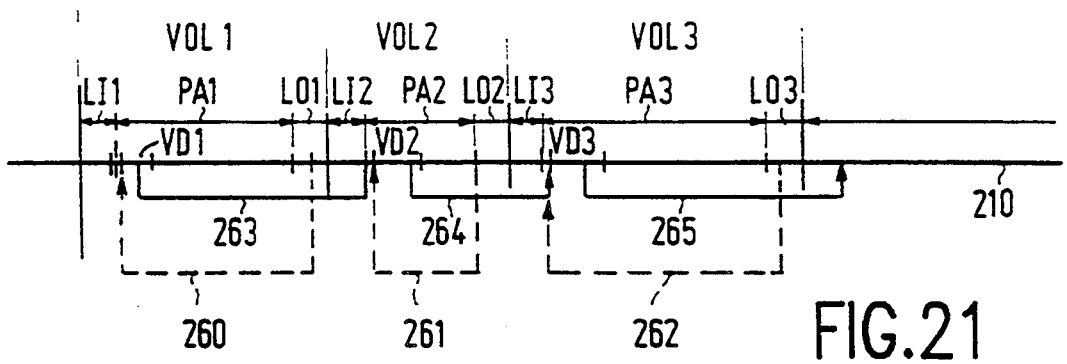
Figure 22:
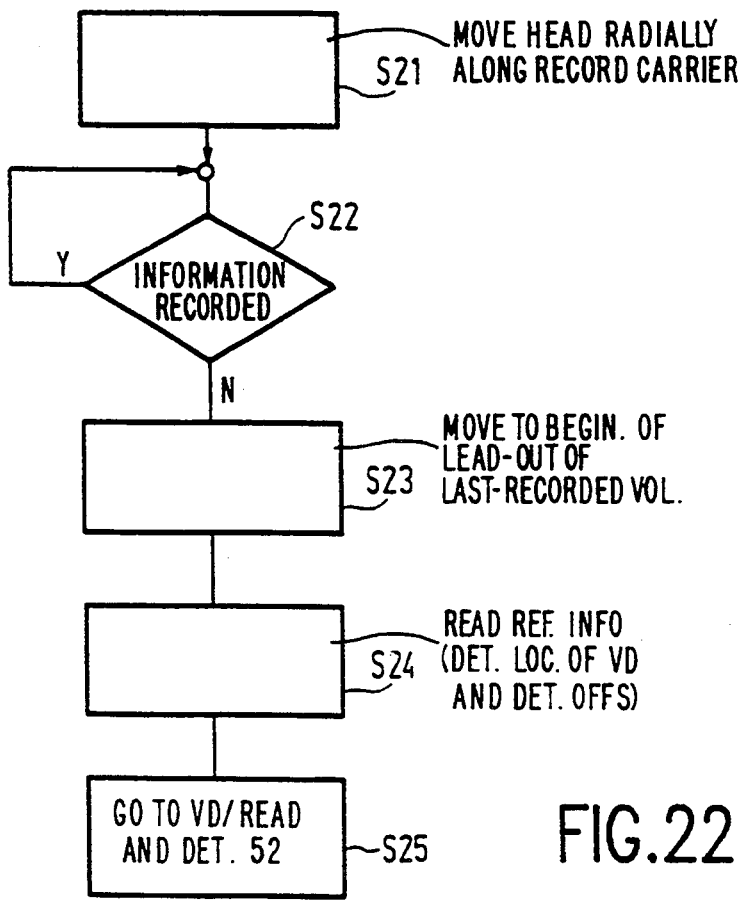
Figure 23:
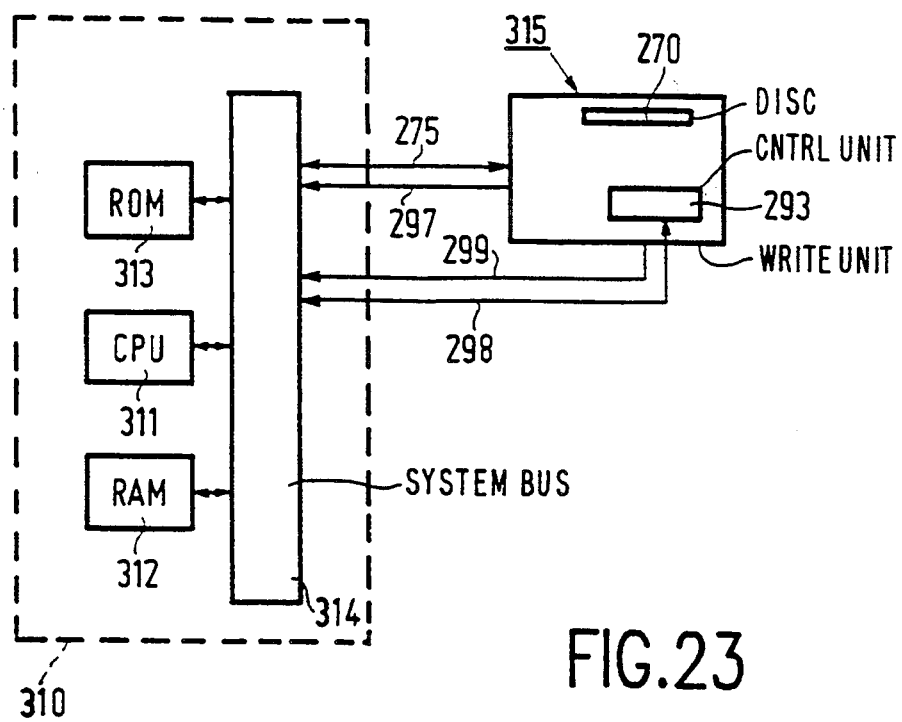

FIGS. 3, 8, and 10 show layouts of a track of a record carrier inscribed by a method according to the invention; FIG. 4 shows an embodiment of a reading device according to the invention;

FIG. 5 shows an embodiment of a detection circuit to be used in the device shown in FIG. 4;

FIG. 7 shows an embodiment of a recording-reading device according to the invention;

FIG. 9 shows the format of a subcode frame of a CD signal;

FIG. 11 shows an embodiment of a PHOTO-CD system, in which the invention is used;

FIGS. 16–18 show a CD-ROM reading apparatus according to the state of the art;

FIGS. 19 and 21 show record carriers obtained by a method according to the invention;

FIGS. 20 and 22 show flow charts of programs executed by a reading apparatus according to the invention;

FIG. 23 shows an embodiment for a record apparatus according to the invention;

FIGS. 24–26, 28 and 29 show flow charts of programs executed by a recording apparatus according to the invention; and FIGS. 27a–27d show, by way of illustration, the layout of a record carrier during successive stages of a method according to the invention.

DESCRIPTION OF THE PREFERRED EMBODIMENTS

Figure 1:
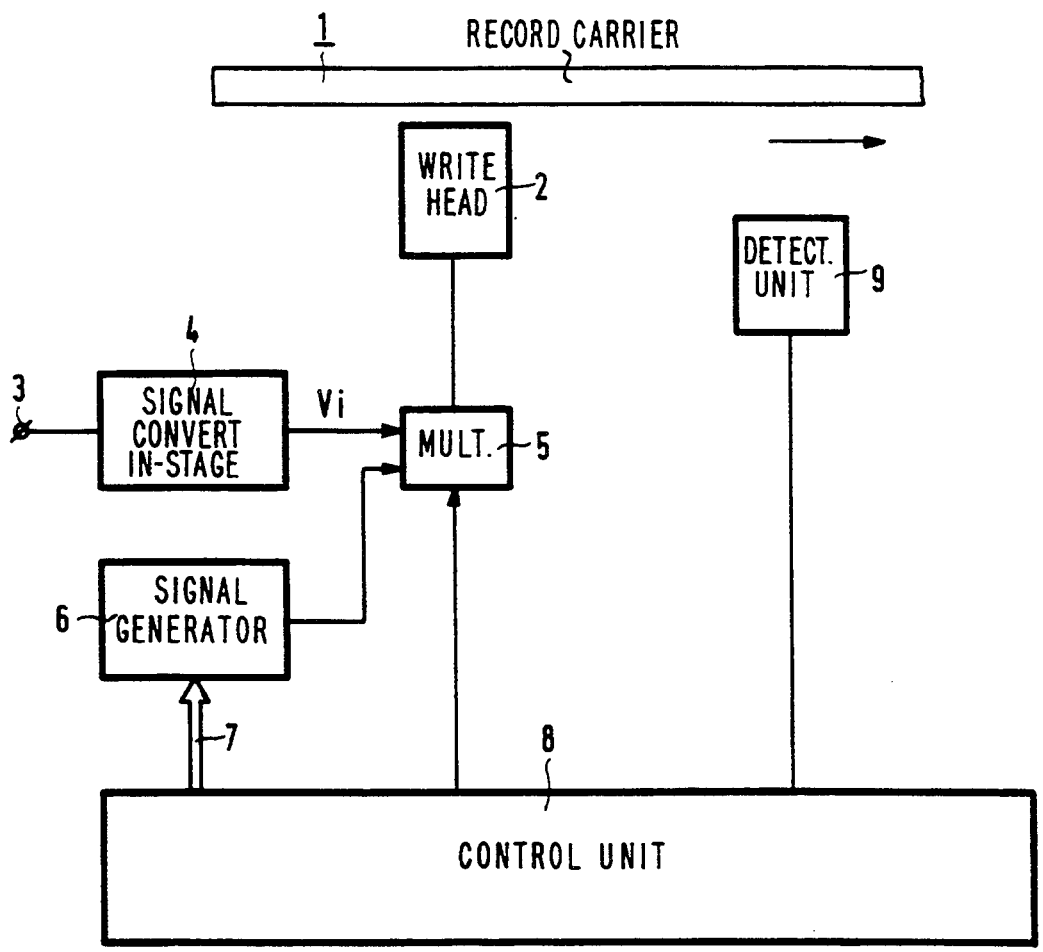
FIG. 1 shows a first embodiment of a recording device according to the invention.

FIG. 1 shows a first embodiment of a recording device according to the invention. A record carrier of an inscribable type, for example, a magnetic or optical, tape or disc-shaped record carrier is denoted by the reference numeral 1. The record carrier 1 is moved relative to write head 2 by a drive unit which is well known and not represented in FIG. 1. The recording device comprises an input terminal 3 for receiving the information to be recorded. The input terminal 3 is coupled to a signal converter input stage 4 which converts the received information into a signal Vi suitable for recording. The signal Vi is applied through a first input of a multiplex circuit 5 to an input of the write head 2. A second input of the multiplex circuit 5 is coupled to a signal generator 6 for generating a lead-out signal which has a format distinguishable from the information signal Vi. The multiplex circuit 5 is of a type that passes the lead-out signal produced by the signal generator 6 or the information signal Vi to the write head 2 in response to a control signal at a control input 10. In response to the passed signal, the write head 2 records an information pattern representing the passed signal in a track of the record carrier. The signal generator 6 is of a type by which additional information can be inserted in the lead-out signal. This additional information (i.e., control information) can be supplied to the signal generator 6 over a bus 7.

The recording device of FIG. 1 also comprises a detection unit 9 of a type capable of detecting the beginning of an unrecorded part of the record carrier. Such a detection unit 9 may comprise, for example, an address detector for detecting an address which denotes the position of the write head 2 relative to the record carrier 1. This address can be compared with a reference address that denotes where the previous recording was terminated. The detection unit 9, however, may also comprise a read head mechanically coupled to the write head 2, or included in the write head 2, and which can be used for detecting whether an information pattern has been recorded in the track. In that event, the beginning of a still unrecorded part of the track can be established by displacing the read head relative to the record carrier 1 and, at the same time, detecting whether information is available in the part of record carrier detected by the read head.

The recording device further includes a control unit 8 for controlling the recording operation, for which purpose the control unit 8 is coupled, for example, to the bus 7 and the control input 10 of the multiplex circuit 5. The control unit 8 may be a program controlled type containing a suitable control program. In a recording device according to the invention, the control program includes a subprogram which effects the recording of the lead-out signal, denoting the end of a set of information files belonging together and recorded in a single recording session, each time after a set of information files has been recorded. (The above-mentioned set of files that belong together will henceforth be denoted an "information volume"). Furthermore, the control program also includes a subprogram that supplies control information to the signal generator 6 over the bus 7 for recording in the lead-out signal. This control information may contain a Table of Contents denoting all the addresses of the files in the already recorded information volumes.

Alternatively, it is possible for an information volume to comprise one or more control files containing information as to the contents of the recorded information files. In that case the control information appended to the lead-out signal over bus 7 may contain the addresses of these control files.

Figure 2:
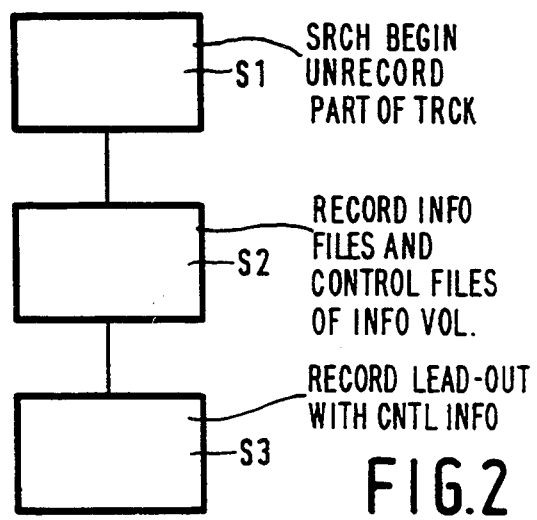
FIGS. 2, 6, 12, 13, 14, 15 show flow charts of control programs executed by control devices of embodiments of devices according to the invention.

FIG. 2 shows a flow chart of a suitable control program. This program comprises a first step S1 at which the beginning of the unrecorded part of the track is searched for. At step S2, the information files of the information volume to be recorded are recorded, and control files containing information relating to files already recorded are also recorded. Subsequently, when step S3 is executed, the necessary control information is applied to the signal generator over bus 7, and the multiplex circuit 5 is activated so that the lead-out signal is applied to the write head.

FIG. 3 diagrammatically shows the track in which the information volumes are recorded under the control of the above described control program. The track is denoted by the reference numeral 20. The information volumes are referenced VOL1, VOL2, VOL3 and VOL4. The lead-out signals included in these information volumes at the ends thereof, are referenced LO1, LO2, LO3 and LO4.

FIG. 4 shows an embodiment of the reading device according to the invention for reading the record carrier 1. The reading device comprises a read head 40. The read head 40 and record carrier 1 can be displaced relative to each other by means of a drive unit 41 of a customary type. The reading device also comprises a detection unit for detecting the beginning of a still unrecorded part of the track. This detection unit may be of the same type as the detection unit 9 of the recording device described above. The detection unit of the represented reading device of FIG. 4 comprises a detection circuit 42 whose input is coupled to an output of the read head 40 for receiving the signal produced by the read head 40. That signal corresponds to the section of the record carrier detected by the read head.

FIG. 5 shows by way of example an embodiment of the detection circuit 42. That circuit comprises a high-pass filter 50 of which an input is coupled to the read head 40 for receiving the signal detected by the read head 40. An output of the high-pass filter 50 is coupled to a rectifier circuit 51. An output of the rectifier circuit 51 is coupled to a comparing circuit 52 for comparing the signal produced by the rectifier circuit 51 with a reference value Eref. In the presence of an information pattern in the part of the record carrier detected by the read head 40, the signal supplied by the read head 40 will comprise a high-frequency component which is passed by the high-pass filter 50 and then rectified in rectifier circuit 51. If an information pattern is present, the output signal of the rectifier circuit 51 will comprise a relatively large dc voltage component exceeding Eref, and the comparing circuit 52 will produce a signal denoting that the output signal of the read head comprises a high-frequency component and, thus, that information has been recorded in the detected section of the record carrier 1.

The output signal of the detection circuit 42 is applied to a control unit 43 of the reading device. See FIG. 4. The control unit 43 is further coupled to an input of the drive unit 41 via an output and to an output of the read head 40 via an input. The control unit 43 may be a program controlled type, e.g. a microcomputer containing a suitable control program. A flow chart of an embodiment of a suitable control program is represented in FIG. 6.

Figure 6:
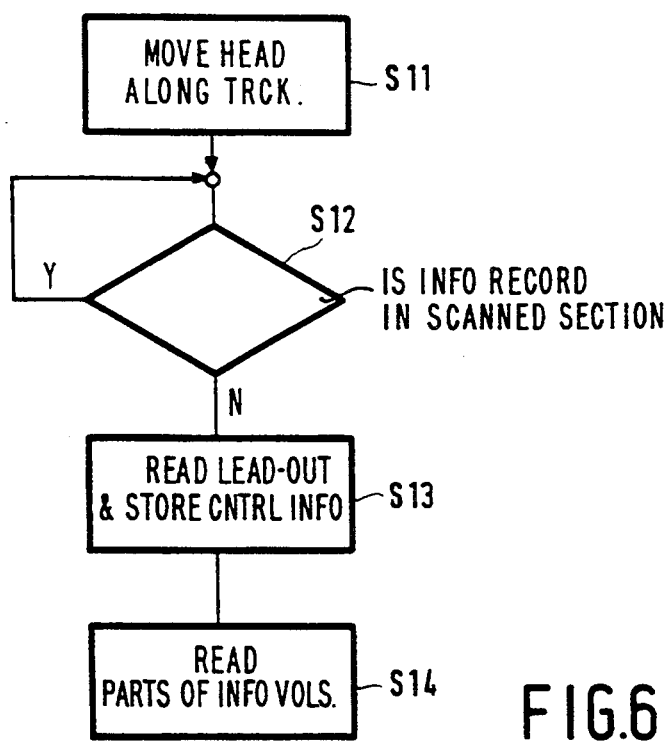

The program of FIG. 6 comprises a step S11 at which drive unit 41 moves the read head 40 from the beginning of the track along the record carrier 1 under the control of the control unit 43. At step S12, a determination is made, in response to the output signal of the detection circuit 42, whether information is recorded in the section of the record carrier 1 scanned by the read 40. Once the output signal of the detection circuit 42 denotes that no information has been recorded in the detected section, the displacement of the read head 40 is stopped, the head is moved in the opposite direction to about the beginning of the track section in which the lead-out signal is recorded that denotes the end of the last-recorded information volume. Subsequently, step S13 is carried out. In step S13, the lead-out signal is read out and the control information contained in this lead-out signal is stored in a memory of the control unit 43. Next step S14 is executed. Step S14 is a program step at which selected parts of the information volumes are read out in response to the read-out control information which contains either information about the contents or refers to a file of content information.

The detecting and reading operations described hereinbefore are advantageous in that each time an information volume is added to the record carrier, control information for reading selected parts of information volumes can be found and read out in a simple manner. The invention is extremely suitable for use with record information on write-once type of record carriers because with those types of record carriers it is not possible to re-write control information customarily recorded at the beginning of a track. The invention is especially advantageous when used with disc-shaped record carriers because by merely displacing the read head in a radial direction the beginning of the unrecorded part of the record carrier can be found extremely rapidly on the basis of a high-frequency component in the signal that is read out therefrom.

The use of the invention is especially important to the PHOTO-CD system in which digitized pictures coming from photo negatives or slides are recorded on an optical record carrier of a so-called CD-WO type. Each time a photo film or slide film is developed, the picture information on the developed photo negatives or slides may then be added to the record carrier, while all the recorded pictures belonging to the same film can then be included in the same, single, information volume. By including the control information in the lead-out signal, the control information necessary for selective detection can be found on the record carrier in a rapid manner, when the lead-out signal is detected.

Hereinafter, with reference to the FIGS. 7 to 15, a detailed embodiment of a recording-reading device in accordance with the invention to be used in a PHOTO-CD system will be given. FIG. 7 shows an embodiment of a recording-reading device 69 according to the invention suitable for recording CD-I, CD-ROM XA and PHOTO-CD signals.

In FIG. 7, reference numeral 70 denotes an optical write-once record carrier of the CD-WO type. Such a record carrier is described in detail in Netherlands patent applications NL-A-8700655, NL-A-8800152, NL-A-8801275 and NL-A-8901145, which applications are deemed to be included herein by reference. The record carrier described in these patent applications comprises a spiral-shaped track which presents a periodical track modulation, whose frequency corresponds to a position information signal modulated in the form of an absolute time code signal.

The optical recording and/or reading device 69 shown in FIG. 7 comprises a drive motor 72 for driving the record carrier 70 in a rotating manner around a spindle 73. An optical read/write head 71 of a customary type is positioned opposite the rotating record carrier 70. The optical read/write head 71 can be displaced in a radial direction by means of a radial displacing unit 74 ("RDU") which comprises, for example, a linear motor or a spindle drive system.

Information formatted according to the PHOTO-CD format, is presented at an input 75 of FIG. 7. The PHOTO-CD format is described, for example, in Netherlands patent application NL-A-9002108, which is deemed to be included herein by reference. The information presented at the input 75 is applied to an input stage 82 which rearranges the received information with the aid of a customary CIRC encoder 76, adds redundant information for error correction and then converts the signal by means of a customary EFM modulator 77 into an EFM modulated signal. The EFM modulated signal is applied to a laser control circuit 73 which converts the EFM modulated signal into a suitable control signal for controlling a write laser used in the read/write head 71. A suitable embodiment of such a laser control circuit 73 is described in detail, for example, in Netherlands patent application NL-A-8800223, which is deemed to be included herein by reference. An output stage 84 for recovering and supplying information that has been read out is inserted between an output of the read-write head 71 and an output terminal 87. For purposes (i.e., main information and subcode information), the output stage comprises an EFM demodulator 85 and CIRC decoder 86 of a customary type.

An ATIP detector 79 of a customary type, which is described, for example, in the aforementioned Netherlands patent application NL-A-8800152 is also coupled to an output of the read/write head 71 of FIG. 7. Such an ATIP detector 79 recovers the absolute time code represented by the FM modulated track modulation in the detected section of the track from the signals read out by the read/write head 71. Furthermore, the ATIP detector 79 produces a speed signal having a frequency corresponding to the speed with which the record carrier 70 is detected by the read/write head 71. This speed signal is applied to a motor control circuit 80.

The motor control circuit 80 of FIG. 7 also receives a clock signal, having a reference frequency, produced by a clock generator 81. The motor control circuit 80 is of a customary type which controls the drive motor 72 in such a way that the frequency of the speed signal remains substantially equal to the reference frequency of the clock signal. Such a motor control circuit 80 may comprise, for example, a PLL motor speed control circuit with which the motor is driven in response to the phase difference between the speed signal and the clock signal. Outputs of the clock signal generator 81 are also coupled to clock inputs of the CIRC encoder 76 and the EFM modulator 77 so as to synchronize supplying of the EFM modulated signal by the input stage 82.

The device shown in FIG. 7 also includes a detection circuit 42 of a type shown, for example, in FIG. 5. Such a circuit is able to detect a high-frequency signal component in a read-out signal produced by the read/write head 71 until the beginning of the unrecorded section of the track is located. The device shown in FIG. 7 further comprises a control unit 83 for controlling the recording and reading operations. To supply subcode information to the EFM modulator 77 the control unit 83 is coupled to subcode inputs of the EFM modulator 77. To receive the subcode information from the read-out signal, the control unit 83 is coupled to subcode outputs of the EFM demodulator. To obtain the absolute time codes produced by the ATIP decoder 79, the control unit 83 is coupled to outputs of the ATIP decoder 79. To control the radial displacement of the read/write head, the control unit 83 is coupled to the radial displacing unit 74. Furthermore, to set the device to the read or write mode, the control unit 83 is coupled to the control circuit 78.

Finally, the device 69 includes a control input 88 and a control output 89 which are coupled to the control unit 83. The control input 88 and the control output 89 are used for receiving and delivering, respectively, control commands for executing reading and recording commands given to the device 69 by an external control unit. Such an external control unit may comprise a picture processor for converting digitized picture information into data files formatted in accordance with the PHOTO-CD format. For a detailed description of such a control unit, reference is made to aforementioned Netherlands patent application NL-A-9002108.

By way of illustration, however, FIG. 11 shows a diagram of a PHOTO-CD system in which such an external control unit is denoted by reference 110. The control unit comprises a microcomputer coupled via customary interface circuits to the inputs 75 and 88 and the outputs 87 and 89 of the recording-reading device 69. The control unit 110 is further coupled to a detection device 111 for detecting and digitizing the picture information to be recorded. The control unit 110 may comprise a microcomputer which is loaded with a suitable control program. However, before the control program is described in detail, a number of different ways in which the control information can be included in the lead-out signal will be described.

Reference is made to FIG. 8 for purposes of describing a first option of how control information can be included in a lead-out signal. In this figure, the spiral-shaped track of the record carrier is diagrammatically shown as an elongated track 90. Furthermore, the absolute time code ATC to be included in the subcode Q-channel of the recorded information is plotted in FIG. 8 against the radial position r on the record carrier. The beginning of the track 90 is denoted ri and the end of the track is denoted ro. The information volumes recorded in the track 90 in successive recording sessions are denoted VOL 1, ..., VOL VI. Each information volume comprises a lead-in area LI in which a lead-in signal is recorded. The lead-in signal for an information volume comprises a Table of Contents which indicates, in a manner prescribed by the CD standard, the initial addresses of the files in a data area of that information volume by way of absolute time codes. For a more detailed description of a suitable format of a Table of Contents, reference is made to Netherlands patent application NL-A-9002490, which application is deemed to be included herein by reference. The lead-in area LI of an information volume is followed by a program area PA in which data files for that information volume are recorded. The program area of an information volume is followed by a lead-out area in which a lead-out signal is recorded. The lead-out signal of an information volume is distinguishable from the files recorded in the program area of that information volume, and, as such, denotes the end of that information volume. The lead-out signal is distinguishable from the other recorded information by an alternating bit pattern (having a frequency of 2 Hz) in the subcode P-channel. In the lead-out signal of an information volume, the Table of Contents of all previously recorded information volumes can be included in the subcode Q-channel as control information. This implies that the lead-out signal of the information volume VOL VI comprises the Table of Contents of the information volumes VOL I, ..., VOL VI. The lead-out signal of the information volume VOL V comprises all Tables of Contents of the information volumes VOL I, ..., VOL V.

The Table of Contents in the lead-out signal of each new information volume to be recorded, thus, comprises the Table of Contents of the lead-out signal of the previous information volume plus the Table of Contents of the newly-recorded information volume. The Table of Contents is preferably included in the subcode Q-channel of the lead-out signal in a model for example mode 5, which is not recognizable by already existing CD detection systems. The mode of the subcode Q-channel is indicated in each subcode Q frame by means of so-called bitgroup CNTRL and ADR situated at the beginning of each subcode frame (see FIG. 9).

Figure 12:
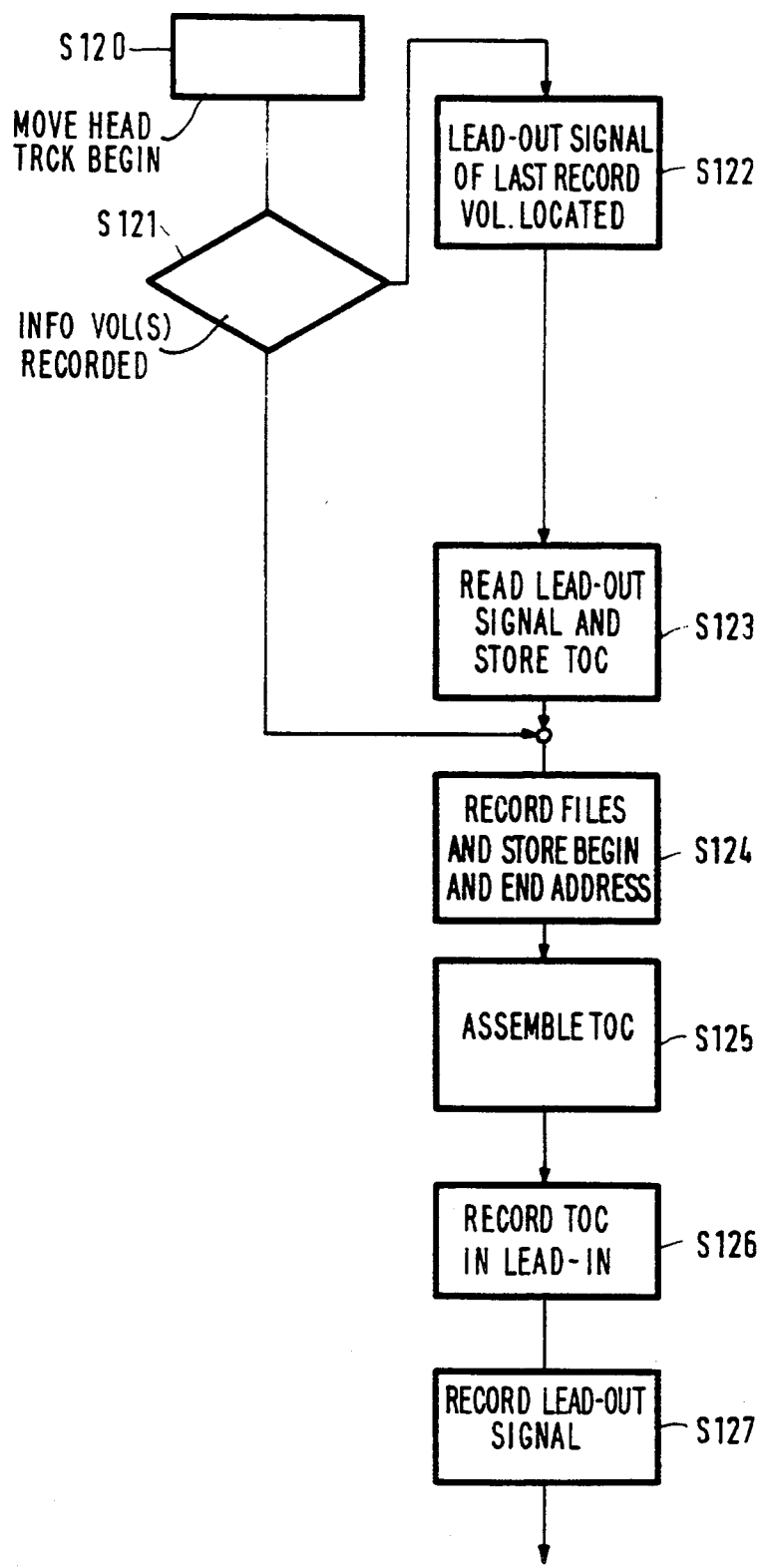
Figure 14:
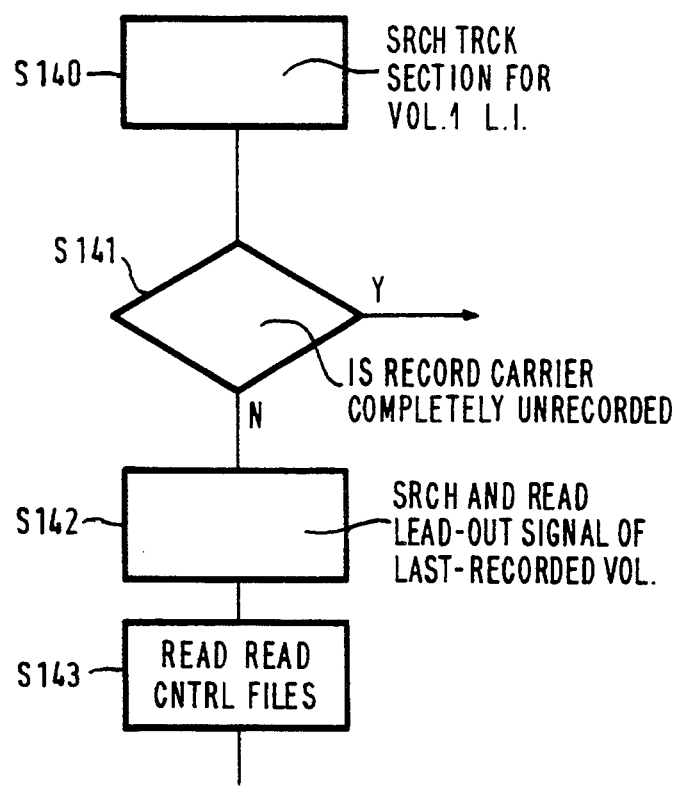

FIG. 12 shows for the previously-described format a flow chart of an embodiment of a suitable control program for the control unit 83. At step S120 of this program, the read/write head 71 is sent in customary fashion to the beginning of the track on the record carrier 70, which beginning is meant for the recording of the Table of Contents of the first information volume. Then, at step 121, it is established on the basis of a Table of Contents, if available, whether the record carrier concerned is still fully unrecorded or already contains one or more recorded information volumes. When recorded information volumes are detected, step S121 is followed by step S122.

In step S122 of FIG. 12, in a similar manner as in the program described with reference to FIG. 6, the lead-out signal of the information volume recorded last is searched for. When so doing, the beginning of the still unrecorded part of the track is detected on the basis of the end of high-frequency contents of the signal that has been read out. It should be observed, however, that the beginning of the unrecorded part of the track can also be searched for in different manners. For example, it is possible to search for the end of the first information volume on the basis of the Table of Contents of the information volume recorded first. For that matter, the address of the lead-out signal of an information volume is included in the Table of Contents. Subsequently, on the basis of the Table of Contents of the second recorded information volume, directly after the lead-out signal of the first information volume, the end of the second information volume can be searched for. This procedure can be continued until the end of the last recorded information volume has been found. Alternatively, it is possible to store the address of the lead-out signal in a memory or at a fixed location on the record carrier (for example, in an area destined for this purpose, which area is situated ahead of the lead-in area of the first information volume in the track) after each recording session of the final address of the information volume recorded last.

Once step S122 has been terminated, at step S123, the lead-out signal is read out and the Table of Contents included in the subcode channel of the lead-out signal (available at the subcode outputs of the EFM demodulator 85) is written by the control unit 83 and stored in a memory. Subsequently, step S124 is executed. In step S124, the files are recorded in the program area PA, and then the beginning and ending addresses of the recorded files are stored in a memory.

The files having been recorded in the program area, at step S125 of FIG. 12, the Table of Contents for the newly recorded information volume is assembled and, subsequently, during the execution of step S126, recorded in the lead-in area of that information volume.

Subsequently, in step S127, the lead-out signal is recorded in the lead-out area LO of the information volume concerned, while the control information corresponding to the contents of the Tables of Contents stored in the memory as well as the newly assembled Table of Contents are applied to the subcode input of the EFM modulator 77.

In the case where at step S121 of FIG. 12 it is established that no information volume has been recorded on the record carrier, step S121 is followed by step S124. This means that no Table of Contents is recorded and stored in the memory so that, when step S127 is executed, only the Table of Contents assembled for the recorded information volume is applied to the EFM modulator while the lead-out signal is being recorded.

It should be noted that it may be useful not to record control information in the lead-out signal of the first recorded information volume so as to avoid any problems that might occur when the information volumes recorded in CD-format and Tables of Contents are read from the lead-out signal by already existing CD reading devices. This is not an essential restriction because the lead-in signal (including a Table of Contents) of the information volume recorded first in a predetermined position on the record carrier has been recorded and can always be found in a simple matter.

FIG. 10 shows a suitable partitioning for recording digitized picture information in the PHOTO-CD format. In this figure, the spiral-shaped track on the record carrier is diagrammatically shown as one elongated track 100 in which the beginning of the track is referenced ri and the end of the track is referenced ro. The information volumes successively recorded in a track 100 are referenced VOL1, ..., VOL4. Each information volume comprises a lead-in area LI in which a Table of Contents is recorded. The lead-in area is followed by a program area in which data files are recorded. These data files contain picture files IP1, ... IPn, storing the digitized pictures; an overview file OV, storing a low-resolution representation for each of the pictures contained in the picture files; an index file IT, containing address information about the picture files and the overview file; a PVD file (Primary Volume Descriptor), describing the file structure according to ISO9660 standard; and control files BB. The control files BB comprise, for example, control files for the reading of the record carrier by means of a CD-I and a CD-ROM XA player. These files, i.e., the BB files, may comprise so-called "Directory" files, a "path" Table and files containing application programs. For a detailed description of the PVD and BB files reference can be made to "Compact Disc Interactive Full Functional Specification", published by NV PHILIPS and SONY Corporation. For a detailed description of the files IT, IP and OV reference can be made to aforementioned Netherlands patent application NL-A-9002108.

The recording of information volumes is preferably effected in such a manner that the files IT, PVD and OV contain information not only relating to the information volume they form part of, but also to all relevant information about all previously-recorded information volumes, whereas the Table of Contents in the lead-in area LI exclusively relates to the information volume it forms part of. Furthermore, the files IT and PVD are preferably to be recorded at fixed positions relative to the beginning of the program area PA so that these files, essential to the read-out control, are easy to detect. If the Table of Contents and other essential control information is included in the program area PA, as described hereinbefore, this information can be found in a rapid manner if the lead-out signal recorded in the lead-out area LO includes an address that refers to the files in which the Table of Contents and other essential control information is recorded in the relevant information volume.

Figure 13:
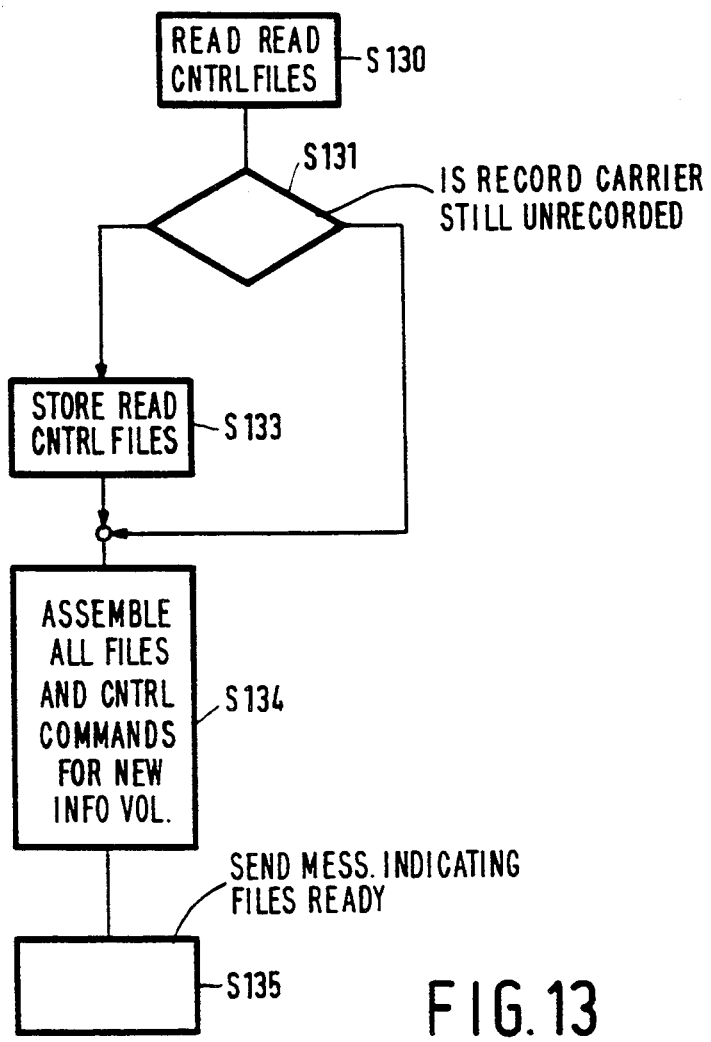

FIG. 13 shows an embodiment of a suitable control program for the external control unit 110 of FIG. 11 for the case where the picture information is recorded according to the above-described PHOTO-CD format. That program begins with the step S130, where the read-write device 69 of FIG. 7 is supplied in a customary fashion with a read command for reading from the record carrier 70 the control files essential for the read control.

The control unit 83 in the device 69 of FIG. 7 is loaded with a control program (an embodiment of which is set forth in FIG. 14) which executes a step S140 (FIG. 14) in response to this read command (i.e., step S130 of FIG. 13). In step S140 of FIG. 14, the track section which is intended to accommodate the lead-in signal of the first information volume is searched for. Subsequently, at step S141, on the basis of any available information in this section, it is established whether the record carrier is still completely unrecorded. If it is, a message will be sent to the external control unit 110 through the control output 89, which indicates that the record carrier is still unrecorded. If it is not, the program proceeds with step S142 at which the lead-out signal of the last recorded information volume is searched for and read out. In that step, the reference information included in the lead-out signal and made available at the subcode outputs of the EFM demodulator 85 are recorded by the control unit 83. Then, at step S143, the files essential for controlling the reading operation and denoted by this reference information are read out and applied to the external control unit 110 via the output 87. While the just-described program (i.e., the program of FIG. 14) is being executed by the control unit 83, the program in control unit 110 (i.e., the program of FIG. 13) with step S131 continues.

In step S131 of FIG. 13, it is established, on the basis of the signals supplied by the device 69 of FIG. 7 via its outputs 87 and 89, whether the record carrier 70 present in the device 69 is still unrecorded. If it is not, the files read out by the device 69 are stored in a memory of the control unit 110 when step S133 is executed. Subsequently, the program of FIG. 13 continues with step S134, where the files for the new information volume are assembled and applied to the device 69 simultaneously with the required control commands, all for recording. Once all the files assembled by the control unit 110 have been applied to the device 69, step S135 is executed. In step S135, the control unit 110 sends out to the control unit 83 of device 69 a control message indicating that all the files to be recorded have been transferred. The control unit 83 has a program that is executed in response to this message. A flow chart of this program is shown in FIG. 15.

Figure 15:
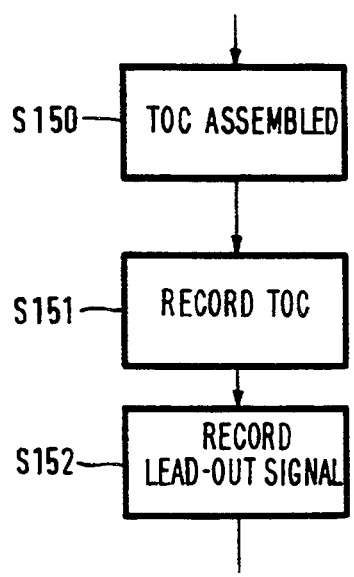

The program of FIG. 15 comprises a step S150 at which the Table of Contents for the information volume concerned is assembled on the basis of address data of files recorded in the information volume which have been stored in a memory in a customary fashion. Subsequently, at step S151, the Table of Contents which has been assembled is recorded in the lead-in area of the associated information volume. At step S152, the lead-out signal is recorded while reference information referring to the addresses of the files by means of the control data essential to the reading operation is included in the lead-out signal. If these files are recorded at fixed positions relative to the beginning of the program area, the address of the beginning of the program area PA can be used as the reference information.

Before discussing another embodiment of the invention in detail, a prior-art CD-ROM system will be briefly described first with reference to FIGS. 16 to 18. A CD-ROM system comprises an optically readable disc on which information is recorded according to the CD-ROM standard, as described in the ISO 9660 standard, and a CD-ROM reading apparatus for reading the disc. The information recorded on the disc comprises main information and subcode information. The subcode information is subdivided into subcode frames. The main information is subdivided into sectors.

FIG. 16 diagrammatically shows the layout of a track 210 of a CD-ROM disc. The track 210 comprises a lead-in (referenced LI), a program area (referenced PA) and a lead-out (referenced LO). The combination of the lead-in LI, the program area PA and the lead-out LO forms an information volume.

The program area PA is intended for storing user information. The main information in the program area PA is subdivided into sectors having a length corresponding to that of a subcode frame. Each of the subcode frames in the program area PA comprises an absolute time code denoting the position at which that subcode frame is recorded relative to the beginning of the program area PA. Each of the sectors also has an absolute time code corresponding to the absolute time code in the subcode frame recorded together therewith.

The program area PA comprises a pregap referenced PG in which no main information is recorded and which can be used for synchronizing the readout. The pregap PG extends over a length referenced by the absolute time codes 0'.0".0 to 0'.2".0.

The pregap is followed by a system area reserved for use by the system. The system area extending from 0'.2".0 to 0'.2".16 is referenced by the letters SA. This system area SA is followed by a volume Descriptor (referenced VD) commencing at 0'.2".16 on each CD-ROM disc. The length of the volume descriptor VD is not fixed but depends on the selected use of the CD-ROM. The volume descriptor VD comprises information about its length and is terminated by a code pattern denoting the end thereof.

The program area PA further includes a path table (referenced PT), one or more directory files (referenced DF) and user files (referenced F1, ..., Fn). The path table PT comprises information about the directory structure of the information stored on the disc and includes references to sector addresses of the directory files DF. In FIG. 16, the reference to the beginning address of the directory file DF is denoted by line 211. The volume descriptor VD includes a reference, denoted by line 212, to the address of the sector in which the path table PT is stored. The directory files DF comprise information about the structure of the user files stored on the disc and include references, denoted by lines 213 and 214, for example, to the addresses of the sectors in which the user files of the directory concerned, for example, F1 and Fn, are stored. The path table PT and directory file DF comprise the control information necessary for searching for the user files F1, ..., Fn.

FIG. 17 diagrammatically shows a CD-ROM reading apparatus for reading a CD-ROM disc 220. The CD-ROM reading apparatus comprises a CD player 221 of which an output is coupled to a system bus 224 of a customary computer system for delivering the read information over a data signal path 223. Furthermore, a central processor 225, a ROM 226, a RAM 227 and one or more information reproducing devices 228 are connected to the system bus 224.

The CD player 221 comprises a control unit 222 for searching for information on the basis of sector addresses received over the control signal path 229. The control signal path 229 is also connected to the system bus 224.

Software for the central processor 225 is loaded in the ROM 226. This software customarily comprises an operating system. It is a task of the operating system, for example, to control and monitor the data transport between the elements of the equipment connected to the system bus.

FIG. 18 diagrammatically shows the structure of a customary operating system such as, for example, the OS9 operating system. Such an operating system comprises a kernel (referenced KR), a file manager (referenced FM) and a device driver (referenced DR). In the case where information is desirably read from the files present on the disc, the kernel KR will send an I/O request to the file manager FM. On the basis of the received I/O request, the file manager decides which sector or sectors are to be read out and indicates to the device driver DR, by means of one or more logic sector numbers (reference LSN), which sector(s) of the disc are to be read out.

The logic sector numbers LSN do not match the absolute time codes in the sectors on the disc 220. However, there is a fixed relation between the logic sector numbers LSN and the absolute time codes. This relation is as follows: LSN=((((MIN*60)-+SEC)*75+FR)−150) for the absolute time code MIN'.SEC".FR. This means that the first sector of the signal area SA is denoted LSN=0 and the first sector of the volume descriptor VD is denoted LSN=16. On the basis of the received logic sector number(s) LSN, the device driver derives the necessary control signals for the control unit 222 to search for the desired sector(s) and reads it (them) out.

Before access can be gained to a requested user file, for example, file F1, the information in the volume descriptor VD, the path table PT and the directory file DF must have been read out. This reading operation takes place during the log-on procedure and/or in reaction to I/O requests made to this effect by the kernel KR. During this operation, the file manager FM sends corresponding logic sector numbers LSN to the device driver DR.

In the CD-ROM system described above, additional information made available at an instant later than the information previously-recorded cannot be read out. Until recently, there was no objection to this because all CD-ROM discs were of the read-only type, so that it was impossible to add additional information to the disc after an initial recording. However, recording apparatus have been developed in which it is possible to record additional information according to a CD format on a write-once disc. Such a disc can also be read out by CD-ROM reading apparatus. With the previously-mentioned recording apparatus it is possible to record additional information next to the previously-recorded information volume at a later instant. However, this additional information cannot be accessed by the existing CD-ROM reading systems because the necessary information for doing so cannot be included in the path table PT and directory files DF due to the fact that the record carrier is of the write-once type.

With reference to FIGS. 19 and 20 additional embodiments for a reading apparatus and a record carrier in accordance with the invention will be described. The embodiments are such that the aforementioned objections can be met.

FIG. 19 diagrammatically shows the layout of a track 210 on a disc 220. This track comprises a first information volume (referenced VOL1) comprising a lead-in LI1, a program area (referenced PA1) and a lead-out (reference LO1), recorded in the same fashion as described with reference to FIG. 16. Contiguous to the information volume VOL1, a second information volume (referenced VOL2) is recorded at a later instant.

The information volume VOL2 of FIG. 19 also comprises a lead-in (referenced LI2), a program area (referenced PA2) and a lead-out (referenced LO2). The information in the program area PA2 is arranged in a similar fashion to the information in the program area PA1, i.e., a system area (reference SA2) and a volume descriptor (referenced VD2), for the information volume VOL2 are located at the same predetermined distances from each other and the beginning of its program area PA2 as system area SA1 and volume descriptor VD1 of the information volume VOL1 are from each other and the beginning of its program area PA1. (Thus the program areas PA1 and PA2 of both information volumes VOL1 and VOL2 are arranged in a similar fashion to that described with reference to FIG. 16).

In FIG. 19, the beginning of the system area SA2 is denoted by the logic sector number LSN=offs, where offs is an offset indicative of the distance between system area SA1 and system area SA2 in terms of logic sector numbers LSN. (As such, offs is also indicative of the distance between the volume descriptor VD1 and the volume descriptor VD2.). The beginning of the volume descriptor VD2 is denoted by logic sector number LSN=offs+16. The end of the volume descriptor VD2 is denoted by the logic sector number LSN=offs+SZ. The volume descriptor VD2 has the same format as the volume descriptor VD1 in the first information volume i.e., VOL1. The volume descriptor VD2, however, may have a different length than the volume descriptor VD1. For that matter, as described in the ISO 9660 standard, a volume descriptor VD may comprise an arbitrary number of supplementary volume descriptors in addition to the primary volume descriptor. It is not necessary for the number of supplementary volume descriptors for volume descriptors VD1 and VD2 to be equal. However, it is preferred that the length of volume descriptor VD2 not exceed that of VD1. The reason for this will be explained later on herein.

The volume descriptor VD2 comprises a reference to the sector address of a path table (referenced PT2) included in the program area PA2. The path table PT2 comprises information about the structure of the directories included in all of the user files (referenced F1, . . . , F6) in the first and second information volumes i.e., VOL1 and VOL2. Furthermore, the path table PT2 comprises references to directory files DF. These directory files DF comprise information about the structure of the user files included in the directory concerned and references to the addresses of those user files. The latter references (i.e., references to user files) are denoted in the FIG. 19 by the reference numerals 240–245. In the embodiment for the layout of the disc shown in FIG. 19, the volume descriptor VD2 comprises a reference to the path table PT2 which comprises a reference to the directory files with the information necessary for accessing all user files F1, . . . , F6 in both the information volumes VOL1 and VOL2.

Generally, a path table PT and directory files DF will be included in the last-recorded information volume. In principle, however, it is alternatively possible for this information to be recorded partly or in full sectors not included in that information volume. It is only essential for the last-recorded information volume to comprise a reference or references to the necessary information.

Still further information volumes may be recorded contiguous to the information volume VOL2. Such information volumes are arranged in a fashion similar to that of information volumes VOL1 and VOL2 just-described with reference to FIG. 19. Each includes a system area SA and a volume descriptor VD which are at the same predetermined distance from each other as volume descriptors VD1 and VD2 are from system areas SA1 and SA2, respectively. The distance between system area SA of each additional information volume and the system area of the first-recorded information volume, i.e., VOL1 will be indicated by the offs value for that additionally-recorded information volume. (As before, the offs value for each additionally recorded information volume will be indicative of the distance the volume descriptor VD of that information volume and the volume descriptor VD1 of the first-recorded information volume VOL1.) If additional information volumes are recorded, the last-recorded information volume is always to include a volume descriptor VD comprising a reference to a path table PT which contains information about the directory structure and references to the directory files DF for all user files in that information volume and at least part of, but preferably all, previously-recorded information volumes.

FIG. 20 shows a modification in the device driver DR of the operating system through which access can be gained to all the user files in all the information volumes. The modification comprises a detection step S201 for detecting whether the logic sector number LSN received from the file manager FM is located in the range O–SZ. This range includes the sector addresses of the volume descriptor VD1 in the first information volume, i.e., VOL1. If the received logic sector number LSN is located in this range, step S202 is executed. In this step the received logic sector number LSN is modified by adding thereto the value of offs for the last-recorded information volume. With respect to the disk track shown in FIG. 19, this entails that when there is a request for access to volume descriptor VD1, access is gained to volume descriptor VD2 in lieu of volume descriptor VD1. Through the volume descriptor VD2 access is gained to all the required information present in the path table PT2 and the directory files DF1', DF2' and DF3' for searching for all the user files in both information volumes VOL2 and VOL1. Hence, all the user information on the disc is accessible. For adequately modifying the logic sector numbers LSN, the values of offs and SZ are to be known by the device driver DR.

It is preferably for a disc to comprise a reference to the sector addresses of a volume descriptor VD in the lead-out LO of each information volume recorded later on. This may be effected, for example, by including a reference to the sector address of the beginning of the volume descriptor VD in the lead-out subcode information of each subsequently-recorded information volume.

FIG. 21 shows by way of illustration a layout of the track 210 in which three information volumes VOL1, VOL2 and VOL3 are recorded. References to the beginning sector addresses of the volume descriptors VD1, VD2 and VD3 are contained in the lead-outs LO1, LO2 and LO3 of the corresponding information volumes denoted by the lines 260, 261 and 262 respectively. The lead-out LO of each information volume is situated at the end of the information volume. The lead-out of the last-recorded information volume may be found by searching for the transition form the track portion in which information is recorded to a track portion in which no information has yet been recorded, as has already been described herein.

A flow chart of an embodiment for a suitable detection control program for use with a record carrier having a track as just-described above is shown in FIG. 22. This program comprises a step S221 in which the drive unit 41 moves the read head 40 radially along the record carrier 1 from the beginning of the track 210 under the control of the control unit 43. (See FIG. 4.) In step S222, in response to the output signal of the detection circuit 42, a determination is made as to whether information has been recorded in the sector of the disc 221 detected by the read head 40. Once the output signal of the detection circuit 42 denotes that no further information has been recorded in the detected sector, the displacement of the read head 40 is stopped in step S223, and the read head is moved in an opposite direction to about the beginning of the lead-out of the last-recorded information volume.

Subsequently, step S224 is executed. In that step, the reference information included in the lead-out LO is read out. This reference information identifies the location of a volume descriptor VD (e.g., the volume descriptor VD for the last-recorded information volume) and, as such denotes the value of offs for that information volume. (It should be noted that the value of offs, which corresponds to the location of the system area SA of an information volume, can easily be determined from the location of its volume descriptor VD because they are always at a predetermined distance from each other as mentioned above.)

Finally, step S225 is executed. In that step, the VD identified volume descriptor by the read reference information is searched for and read out, and the value of SZ is determined. This value i.e., SZ, may be determined, for example, by means of information about the length of the volume descriptor VD included in the volume descriptor VD. Alternatively, it is possible, to detect the end of the volume descriptor VD by detecting a volume descriptor set terminator situated at the end of the volume descriptor VD.

FIG. 23 diagrammatically shows an embodiment for a recording apparatus according to the invention. The recording apparatus comprises a computer system 310 of a customary type, with a central processor 311, a RAM 312 and a ROM 313. The central processor 311, the RAM 312 and the ROM 313 are connected to a system bus 314 for mutual data transport. The recording apparatus further includes a write unit 315 for writing information on a disc 270 of a write-once type. The write unit 315 is connected to the system bus 314 over data signal paths 275 and 297 for receiving information to be recorded and supplying information that has been read out. The write unit 315 comprises a control unit 293 for controlling the writing operation. The control unit is connected to the system bus 314 over the control signal paths 298 and 299 for the exchange of control commands and control data between the control unit 293 and the computer system 310.

Figure 24:
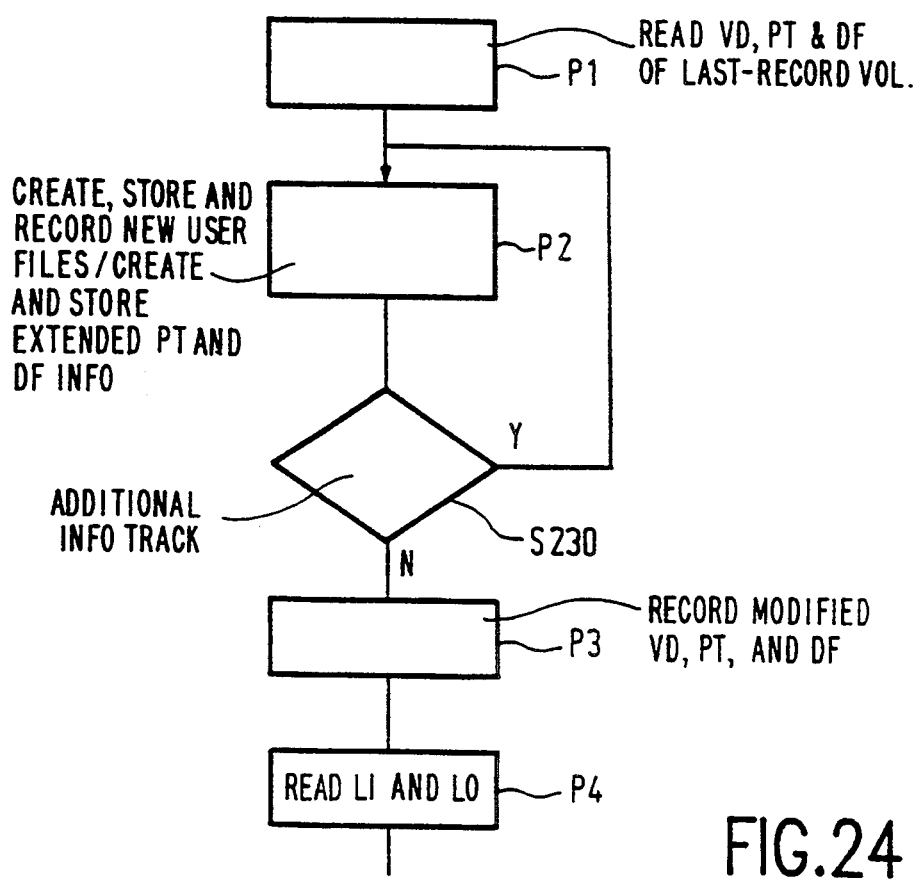

FIG. 24 shows a flow chart of a program for use in the computer system 310 of FIG. 23 for recording a next information volume. This program comprises a procedure P1 in which the computer system applies control commands to the control unit 293 over the control signal path 98 for reading the volume descriptor VD, the path table PT and the directory files DF from the last-recorded information volume. This read information is copied to the RAM 312. Procedure P1 is followed by procedure P2.

In procedure P2 new user files are created in a customary fashion, formatted and temporarily stored in the RAM 312. In addition, the path table PT and directory files DF are extended by information about the newly created user files. Then, the newly created user files are recorded in a so-called information track on the track of disc 270.

Next, in step S230, a determination is made as to whether more information tracks are to be recorded in the information volume. If so, step S230 is followed by procedure P2. If there are not, procedure P3 is executed, wherein the modified volume descriptor VD, path table PT and file directories DF are recorded on the disc 270. Subsequently, during the execution of procedure P4, the lead-in information is recorded in the lead-in and the lead-out information in the lead-out of the information volume.

Figure 25:
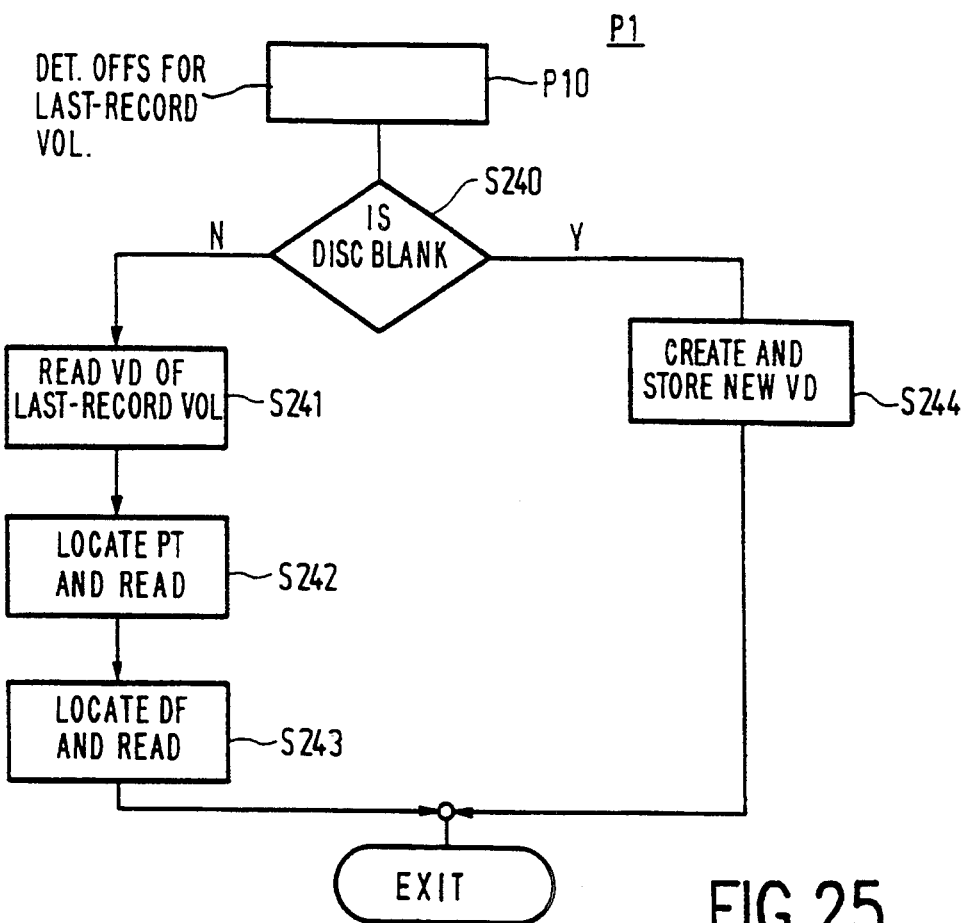

FIG. 25 shows a flow chart of an embodiment for the procedure P1. The procedure P1 is initiated by executing procedure P10 in which the value of offs of the last-recorded information volume is determined, for example, by the steps S221 to S225 as shown in FIG. 22. Once the procedure P10 has been executed, a determination is made in step S240 as to whether the disc 270 is blank. This is possible, for example, by verifying, while the procedure P10 is being executed, whether information is already present on the disc 270 and, subsequently, locating a flag indicating that the disc 270 is still unrecorded. If it is established, during the execution of step S240, that information volumes have already been recorded on the disc 270, the volume descriptor VD of the last-recorded information volume (denoted by the value of offs) is read out in step S241, and the contents are copied to the RAM 312.

Subsequently, in the process of FIG. 25, step S242 is executed, wherein the logic sector number LSN of the path table PT is determined on the basis of the volume descriptor VD read out, and the path table PT is read out. The contents of the read-out path table PT are copied to the RAM 312. Furthermore, in step S243, the logic sector numbers LSN of the directory files DF are determined on the basis of the read-out path table PT, and these directory files DF are read out. The contents of the directory files DF are again copied to the RAM 312. Once step S243 has been executed, the procedure P1 is terminated.

In the case where it is established in step S240 that the disc 70 is still completely blank, that step is followed by step S244. In step S244, a new volume descriptor VD is created and stored in the RAM 312.

Figure 26:
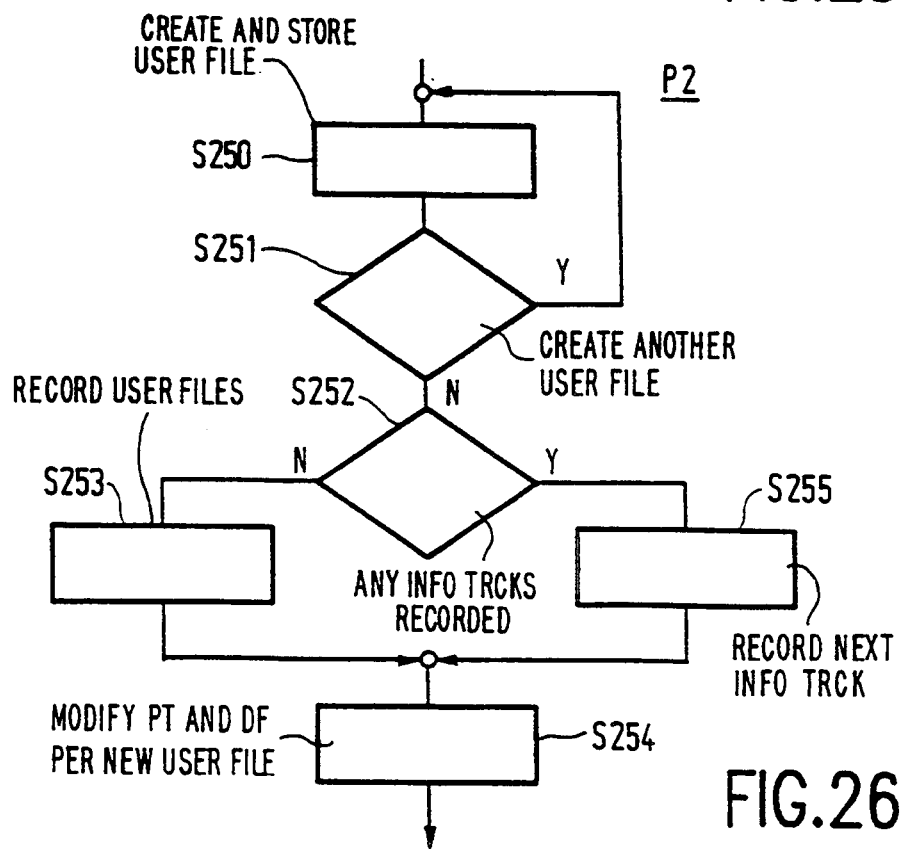
Figure 27:
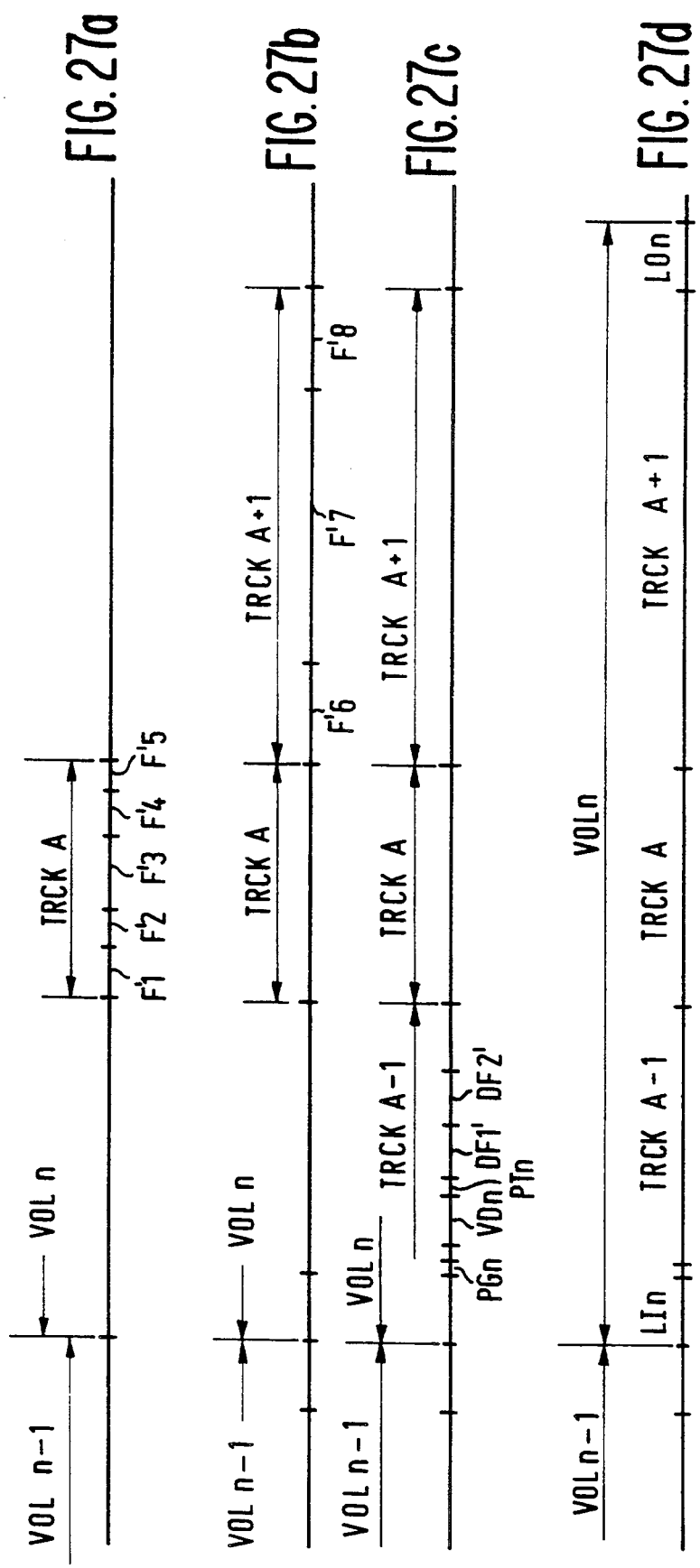

FIG. 26 shows a flow chart of an embodiment for the procedure P2. This procedure comprises a step S250 in which a user file is created, formatted and stored in the RAM 312 in a customary fashion. Subsequently, in step S251, a determination is made as to whether a next user file is to be added to the information track to be created. If so, step S250 is executed again. If not, step S252 is executed. In step S250, a determination is made as to whether one or more information tracks of the information volume to be recorded have actually been recorded. If no information track has yet been recorded for the information volume to be recorded, step S253 is executed, wherein the user files stored in the RAM 312 are recorded. These user files are recorded as a single information track. The recording is initiated in a sector which is located at a specific distance from the end of the previous information volume. This distance is to be selected sufficiently large for introducing a lead-in LI between the end of the last-recorded information volume and the beginning of the newly recorded information track, and for introducing a volume descriptor VD, a path table PT and directory files DF.

FIG. 27a shows by way of illustration the position of the first-recorded information track of a new information volume. In this figure the last fully-recorded information volume is referenced VOLn-1. The first-recorded information track containing new files of the new information volume to be recorded (reference VOLn) is referenced TRCK A. This information track comprises the user files F1', F2', F3', F4' and F5'.

Once information track TRCK A has been recorded, the copies of the path table PT and directory files DF present in the RAM 312 are modified by information concerning the newly recorded user files F1', . . . , F5' during the execution of step S254. After step S254 has been executed, the procedure P2 is terminated.

When an information track (e.g., TRCK A of FIG. 27b) of an information volume to be recorded (e.g., VOLn of FIG. 27a), has actually been recorded, step S252 is followed by step S255. In step S255 of FIG. 26, the next information track (e.g., the information track referenced TRCK A+1 in FIG. 27b) is recorded adjoining the already recorded information track (e.g., TRCK A of FIG. 27b). This next information track also comprises one or more user files (referenced F6', F7' and F8' in FIG. 27b).

Once the step S255 of the process of FIG. 26 has been executed, step S254 is again executed i.e., the path table PT and directory files DF are modified by information concerning the user files recorded in the new information track TRCK A+1.

After step S254 of FIG. 26 has been executed, the procedure P2 is terminated. If not further user files need to be recorded in information tracks, procedure P3 will be started subsequent to procedure P2. In the procedure P3, the volume descriptor VD, the path table PT and the directory files DF will be recorded in an information track (e.g., the information track referenced TRCK A−1 of FIG. 27c) between the end of the last-recorded information volume (referenced VOLn-1 of FIG. 27c) and the beginning of the first track (referenced TRCK A of FIG. 27c) containing user files of the new information volume to be recorded, i.e., VOLn of FIG. 27c. Before commencing recording of an information track, such as, TRCK A−1, the sector addresses of the sectors of information track TRCK A−1 in which the volume descriptor VD, the path table PT and the directory files DF are to be recorded are determined, and the reference information in the volume descriptor VD and path table PT is modified in accordance with the appropriate sector address(es) of these sector addresses.

Figure 28:
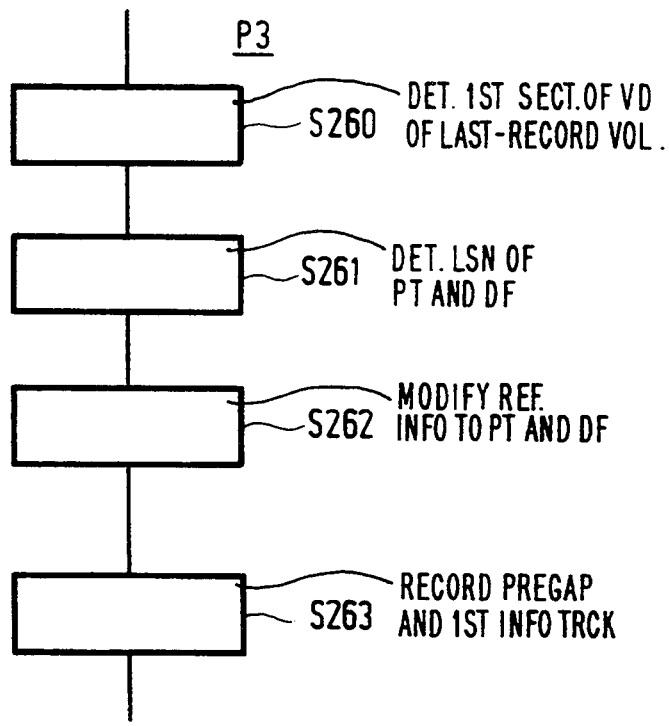

FIG. 28 shows a flow chart of an embodiment for procedure P3. This procedure is commenced by a step S260 in which the logic sector number LSN of the first sector of the volume descriptor VD of the last-recorded information volume is determined on the basis of information which denotes the logic sector number LSN of the last sector in the lead-out of that information volume. Subsequently, in step S261, the logic sector numbers LSN of the first sectors of the path table PT and the directory files DF are determined on the basis of the logic sector number LSN of the first sector of the volume descriptor VD and the size of the volume descriptor VD, path table PT and directory files DF. Then, in step S262, the reference information to the beginning of the path table PT and the directory files DF contained in the volume descriptor VD and the path table PT, respectively, is modified. The volume descriptor VD may comprise, as required, a reference to the sector intended for the recording of the volume descriptor VD of the information volume to be recorded next.

After step S262 of FIG. 28, step S263 is executed. In that step, the pregap preceding the information track TRCK A−1 of FIG. 27c, and information track TRCK A−1 itself are recorded. The recording is preferably such that the information track TRCK A−1 continues to the beginning of information track TRCK A of FIG. 27c. The information track portion between the last directory file DF and the beginning of information track TRCK A may be filed by sectors having dummy information, for example, sectors having only "0"-bits. Once step S263 has been executed, the procedure P3 is terminated and procedure P4 is commenced.

Figure 29:
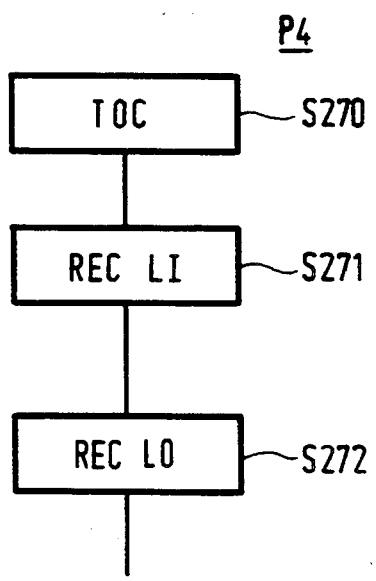

FIG. 29 shows a flow chart of an embodiment for the procedure P4. The procedure comprises a first step S270, wherein a Table of Contents (TOC) according to the format prescribed by the CD standard is assembled from the initial addresses of the information tracks included in the information volume. Subsequently, in step S271, information is recorded in the lead-in, i.e., LIn of FIG. 27d. The Table of Contents is included in the subcode of the information recorded in the lead-in LIn of FIG. 27d.

Then, in step S272 of FIG. 29, the lead-out information is recorded in the lead-out, i.e., LOn of FIG. 27d. A reference to the initial address of the volume descriptor VD included in the information volume may then be included in the lead-out LOn as required. After the information has been recorded in the lead-in LIn and the lead-out LOn, the recording of the information volume is terminated, and the disc 270 can be read by means of the reading apparatus according to the invention.

The above describes an apparatus and method in which the information volume comprises a number of information tracks to be recorded in a number of separate recording sessions. Nonetheless, it is alternatively possible to have all information to be recorded included in the information volume in a memory at one time, and then record the complete information volume in a single recording session.

In the foregoing, the volume descriptor VD for the information volume to be recorded next is obtained by adapting the volume descriptor VD read out from the last-recorded information volume. Alternatively, it is possible to assemble this volume descriptor VD each time anew. It is only important that each new volume descriptor VD comprise a reference to files where the information necessary for controlling the search operation is available. The information referred to by the volume descriptor need not necessarily be recorded in the same information volume as the one in which the volume descriptor occurs.

The embodiments described with reference to the FIGS. 16 to 29 relate to the recording of information formatted according to the CD-ROM standard. However, the invention is not restricted to recording this type of information. Furthermore, the invention may be applied to each recording of information volumes in which control information for information search included in the information volumes is included in each information volume.

Finally, it should be observed that the invention is pre-eminently suitable for recording and reading information on/from write-once record carriers. The use of the invention, however, is not restricted to this. It may also be applied to recording and reading information on/from record carriers of the rewritable type.

We claim:

1. A method of recording information volumes in a track of a record carrier, the method comprising:
   recording a first information volume in the track, the first information volume including (i) a lead-out signal denoting the end of the first information volume and (ii) control information for use in controlling reading of the first information volume; and
   recording at least one additional information volume in the track following the lead-out signal of the first information volume, each additional information volume including a lead-out signal (i) denoting the end of that additional information volume and (ii) having control information for use in controlling reading of at least that additional information volume.

2. The method as claimed in claim 1, wherein the control information in the lead-out signal of each additional information volume includes reference information referring to at least one address of information included in at least that additional information volume.

3. The method as claimed in claim 1, wherein each additional information volume further includes a control file which (i) is separate from the lead-out signal of that additional information volume and (ii) includes additional control information for use in controlling reading of that additional information volume; and the control information included in the lead-out signal of each additional information volume includes reference information indicative of the beginning of the control file included in that additional information volume.

4. The method as claimed in claim 3, wherein the additional control information in the control file of each additional information volume further includes control information for use in controlling reading of at least one previously-recorded information volume.

5. The method as claimed in claim 1, wherein the control information in the lead-out signal of each additional information volume includes Tables of Contents for that additional information volume and all previously-recorded information volumes.

6. The method as claimed in claim 1, wherein each additional information volume further includes at a predetermined address in that additional information volume a control file which (i) is separate from the lead-out signal of that additional information file and (ii) includes additional control information for use in controlling reading of that additional information volume; and the control information included in the lead-out signal of each additional information volume includes reference information which refers to the predetermined address in that additional information volume.

7. The method as claimed in claim 6, wherein the additional control information in the control file of each additional information volume further includes control information for use in controlling reading of at least one previously-recorded information volume.

8. The method as claimed in claim 2, wherein the reference information further refers to at least one address of information included in at least one previously-recorded information volume.

9. The method as claimed in claim 2, wherein each additional information volume further includes a control file which (i) is separate from the lead-out signal of that additional information volume and (ii) includes additional reference information referring to at least one address of information included in at least one previously-recorded information volume; and the reference information refers to at least the address of the beginning of the control file included in that additional information volume.

10. A method of recording at least one additional information volume in a track of a record carrier having a first information volume recorded therein, the first information volume including a lead-out signal denoting the end of the first information volume, the method comprising:
    generating a lead-out signal for each additional information volume to be recorded, each such lead-out signal (i) denoting the end of the additional information volume it is generated for and (ii) including control information for use in controlling reading of at least the additional information volume it is generated for; and
    recording each additional information volume with the lead-out signal generated for that additional information volume in the track following the lead-out signal of the information volume recorded last.

11. The method as claimed in claim 10, wherein the control information in the lead-out signal for each additional information volume includes reference information referring to at least one address of information included in at least that additional information volume.

12. The method as claimed in claim 11, wherein the reference information further refers to at least one address of information included in at least one previously-recorded information volume.

13. The method as claimed in claim 11, wherein each additional information volume further includes a control file which (i) is separate from the lead-out signal for that additional information volume and (ii) includes additional reference information referring to at least one address of information included in at least one previously-recorded information volume; and the reference information refers to at least the address of the beginning of the control file included in that additional information volume.

14. The method as claimed in claim 10, wherein each additional information volume further includes a control file which (i) is separate from the lead-out signal for that additional information volume and (ii) includes additional control information for use in controlling reading of that additional information volume; and the control information included in the lead-out signal for each additional information volume includes reference information indicative of the beginning of the control file included in that additional information volume.

15. The method as claimed in claim 14, wherein the additional control information in the control file of each additional information volume further includes control information for use in controlling reading of at least one previously-recorded information volume.

16. The method as claimed in claim 10, wherein the control information in the lead-out signal of each additional information volume includes Tables of Contents for that information volume and all previously-recorded information volumes.

17. The method as claimed in claim 10, wherein each additional information volume further includes at a predetermined address in that information volume, a control file which (i) is separate from the lead-out signal for that additional information file and (ii) includes additional control information for use in controlling reading of that additional information volume; and the control information included in the lead-out signal for each additional information volume includes reference information which refers to the predetermined address in that additional information volume.

18. The method as claimed in claim 17, wherein the additional control information in the control file of each additional information volume further includes control information for use in controlling reading of at least one previously-recorded information volume.

19. A device for recording information volumes in a track of a record carrier, the device comprising:
    means for receiving at least one information signal for each information volume to be recorded;
    generating means for generating a lead-out signal for each information volume to be recorded, each lead-out signal (i) denoting the end the information volume it is generated for and (ii) including control information for use in controlling reading of the information volume it is generated for; and
    recording means for recording the at least one information signal for each information volume together with the lead-out signal generated for that information volume in the track to form that information volume, said recording means recording each information volume in the track following the lead-out signal of the information volume recorded last.

20. The device as claimed in claim 19, further comprising searching means for searching for the lead-out signal of the information volume recorded last.

21. The device as claimed in claim 20, wherein said recording means comprises a write head having detector means for detecting whether information is recorded in the track, and said searching means comprises means for determining a transition between a recorded track section and an unrecorded track section denoting the end of the lead-out signal of the information volume recorded last on the basis of what the detector means detects.

22. The device as claimed in claim 21 being adapted for recording the information volumes on a disc-shaped record carrier in substantially concentric tracks sections, the device further comprising a drive motor for driving the record carrier in a rotating fashion and a radial drive means for moving said write head in a radial direction relative to the record carrier, and wherein said searching means further comprises means for causing said radial drive means to move said write head in a radial direction relative to the record carrier.

23. A device for reading a record carrier on which information volumes are recorded in successive track sections of the record carrier, each information volume having a lead-out signal (i) denoting the end thereof and (ii) including control information for use in controlling reading of at least that information volume, the device comprising:

read means for reading the record carrier;

searching means for locating the lead-out signal of the information volume recorded last; and control means for controlling reading of the information volumes on the basis of the control information included in the lead-out signal of the information volume recorded last.

24. The device as claimed in claim 23, further comprising means for storing the control information included in the lead-put signal of the information volume recorded last.

25. The device as claimed in claim 23, wherein said recording means comprises a read head having detector means for detecting whether information is recorded in the track, and said searching means comprises means for determining a transition between a recorded track section and an unrecorded track section denoting the end of the lead-out signal of the information volume recorded last on the basis of what the detector means detects.

26. The device as claimed in claim 25 being adapted for reading information volumes recorded on a disc-shaped record carrier in substantially concentric tracks sections, the device further comprising a drive motor for driving the record carrier in a rotating fashion and a radial drive means for moving said read head in a radial direction relative to the record carrier, and wherein said searching means further comprises means for causing said radial drive means to move said read head in a radial direction relative to the record carrier.

* * * * *

UNITED STATES PATENT AND TRADEMARK OFFICE
CERTIFICATE OF CORRECTION

PATENT NO. : 5,341,356

DATED : August 23, 1994

INVENTOR(S) : Adrianus H. Dieleman, et. al.

It is certified that error appears in the above-indentified patent and that said Letters Patent is hereby corrected as shown below:

Column 22, line 39, Claim 19, after "end" insert --of--.
Column 24, line 1, Claim 24, change "lead-put" to --lead-out--.

Signed and Sealed this

Third Day of January, 1995

Attest:

BRUCE LEHMAN

Attesting Officer

Commissioner of Patents and Trademarks